(12) United States Patent
Futatsugi et al.

(10) Patent No.: US 12,194,987 B2
(45) Date of Patent: Jan. 14, 2025

(54) DANGEROUS SCENE PREDICTION DEVICE, DANGEROUS SCENE PREDICTION METHOD, AND DANGEROUS SCENE PREDICTION PROGRAM

(71) Applicant: NEC Corporation, Tokyo (JP)

(72) Inventors: Yasunori Futatsugi, Tokyo (JP); Yoshihiro Mishima, Tokyo (JP); Atsushi Fukuzato, Tokyo (JP); Jun Nakayamada, Tokyo (JP); Kenji Sobata, Tokyo (JP); Yuki Chiba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 664 days.

(21) Appl. No.: 17/293,564

(22) PCT Filed: Sep. 13, 2019

(86) PCT No.: PCT/JP2019/036151
§ 371 (c)(1),
(2) Date: May 13, 2021

(87) PCT Pub. No.: WO2020/100408
PCT Pub. Date: May 22, 2020

(65) Prior Publication Data
US 2022/0001858 A1    Jan. 6, 2022

(30) Foreign Application Priority Data

Nov. 13, 2018  (JP) .................................. 2018-212890

(51) Int. Cl.
*B60W 30/08*   (2012.01)
*G06N 3/08*    (2023.01)
*G06V 20/56*   (2022.01)

(52) U.S. Cl.
CPC ............... *B60W 30/08* (2013.01); *G06N 3/08* (2013.01); *G06V 20/56* (2022.01); *B60W 2420/403* (2013.01); *B60W 2554/4041* (2020.02)

(58) Field of Classification Search
CPC ............ B60W 30/08; B60W 2420/42; B60W 2554/4041; G06N 3/08; G06N 3/063;
(Continued)

(56) References Cited

U.S. PATENT DOCUMENTS 10,467,487 B1 * 11/2019 Wang ................... G05D 1/0231
11,341,755 B2 *  5/2022 Oishi ..................... G06V 20/56
(Continued)

FOREIGN PATENT DOCUMENTS

JP    H07-333242 A   12/1995
JP    2011-100338 A   5/2011
(Continued)

OTHER PUBLICATIONS

Adaptive Deep Convolutional Neural Networks for Scene-Specific Object Detection Xudong Li, Mao Ye, Member, IEEE, Yiguang Liu, Member, IEEE, and Ce Zhu, Fellow, IEEE, Published Date: Sep. 7, 2017 (Year: 2017).*

(Continued)

*Primary Examiner* — Mohamed Abdo Algehaim
(74) *Attorney, Agent, or Firm* — Sughrue Mion, PLLC

(57) ABSTRACT

A dangerous scene prediction device 80 for predicting a dangerous scene occurring during driving of a vehicle includes a learning model selection/synthesis unit 81 and a dangerous scene prediction unit 82. The learning model selection/synthesis unit 81 selects, from two or more learning models, a learning model used for predicting the dangerous scene, depending on a scene determined based on information obtained during the driving of the vehicle. The (Continued)

dangerous scene prediction unit 82 predicts the dangerous scene occurring during the driving of the vehicle, using the selected learning model.

6 Claims, 18 Drawing Sheets

(58) Field of Classification Search
CPC ............... G06N 3/00–3/126; G06V 20/56; G08G 1/16; G08G 1/00–1/22
USPC ................................................. 701/1
See application file for complete search history.

(56) References Cited

U.S. PATENT DOCUMENTS

| | | | | |
|---|---|---|---|---|
| 11,494,674 | B2* | 11/2022 | Kogano | G06N 20/00 |
| 2012/0216208 | A1* | 8/2012 | Takemura | G08G 1/167 |
| | | | | 718/103 |
| 2015/0006132 | A1* | 1/2015 | Matsumura | G08G 1/096741 |
| | | | | 703/2 |
| 2015/0310145 | A1* | 10/2015 | Nica | G09B 9/052 |
| | | | | 703/8 |
| 2017/0301345 | A1* | 10/2017 | Israelsson | G10L 15/00 |
| 2018/0170375 | A1* | 6/2018 | Jang | B60W 30/0956 |
| 2018/0276779 | A1* | 9/2018 | Bahoy | G06Q 10/067 |
| 2018/0307967 | A1* | 10/2018 | Graf | G01S 7/417 |
| 2018/0336423 | A1* | 11/2018 | Ban | G06V 20/58 |
| 2019/0095716 | A1* | 3/2019 | Shrestha | G08B 21/187 |
| 2019/0158581 | A1* | 5/2019 | Giannella | G07C 5/008 |
| 2019/0180144 | A1* | 6/2019 | Tsishkou | G06V 20/52 |
| 2019/0333232 | A1* | 10/2019 | Vallespi-Gonzalez | |
| | | | | G06V 20/30 |
| 2019/0340448 | A1* | 11/2019 | Hayashi | G06N 3/08 |
| 2020/0014761 | A1* | 1/2020 | Kawaai | H04L 67/12 |
| 2020/0039520 | A1* | 2/2020 | Misu | B60W 60/0013 |
| 2020/0065711 | A1* | 2/2020 | Clément | G06N 3/044 |
| 2020/0143670 | A1* | 5/2020 | Kitani | G06N 3/042 |
| 2020/0160537 | A1* | 5/2020 | Urtasun | G06T 7/593 |
| 2020/0202184 | A1* | 6/2020 | Shrestha | G06F 16/9024 |
| 2020/0307615 | A1* | 10/2020 | Suzuki | G08G 1/16 |
| 2021/0009163 | A1* | 1/2021 | Urtasun | G08G 1/20 |
| 2021/0133218 | A1* | 5/2021 | Bukowski | G06F 16/212 |
| 2023/0140540 | A1* | 5/2023 | Zheng | G06V 30/19147 |
| | | | | 382/104 |

FOREIGN PATENT DOCUMENTS

| | | |
|---|---|---|
| JP | 2017-187848 A | 10/2017 |
| WO | 2018/198823 A1 | 11/2018 |

OTHER PUBLICATIONS

International Search Report for PCT Application No. PCT/JP2019/036151, mailed on Dec. 3, 2019.
English translation of Written opinion for PCT Application No. PCT/JP2019/036151, mailed on Dec. 3, 2019.

* cited by examiner

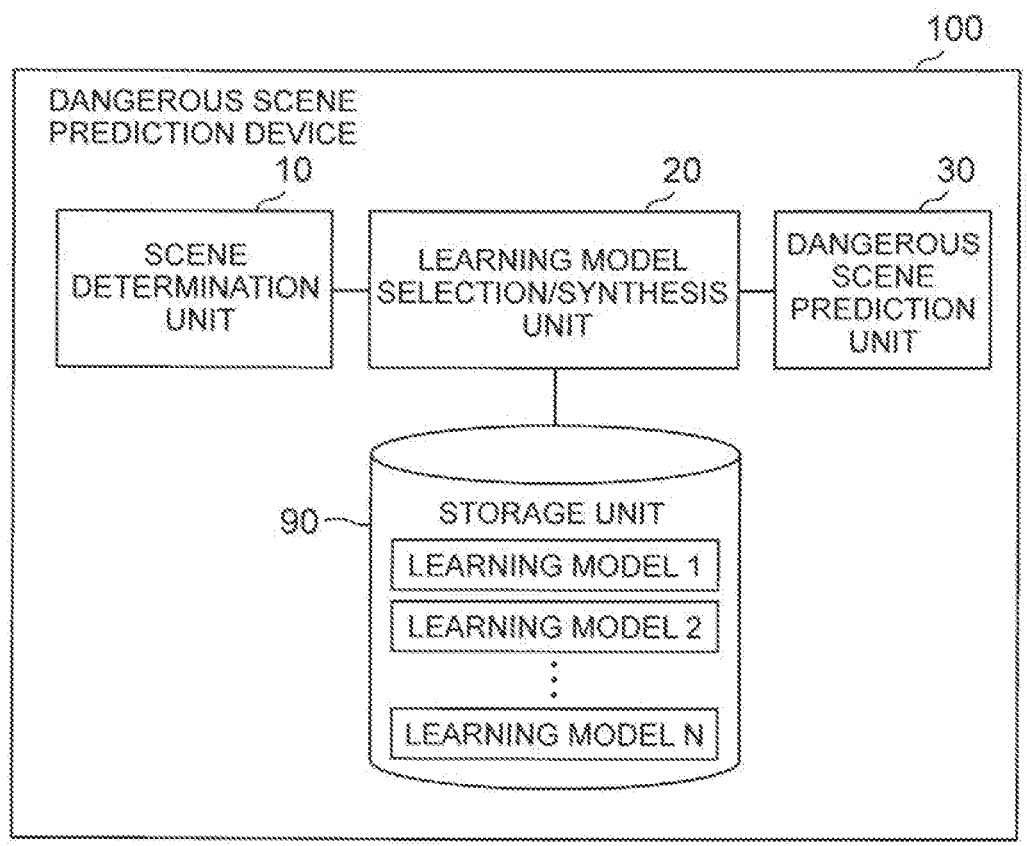

FIG. 6

| DANGEROUS SCENE PREDICTION LEARNING MODEL | (1) INTERRUPTION PREDICTION MODEL | (2) LEFT-TURN COLLISION PREDICTION MODEL | (3) RUN-OUT CROSSING PREDICTION MODEL | (4) LATERAL INTRUSION PREDICTION MODEL |
|---|---|---|---|---|
| IMPORTANT RECOGNITION OBJECT/POSTURE | REAR OF PASSENGER CAR, TRUCK, AND BUS | FRONT AND REAR OF PEDESTRIAN AND BICYCLE | LATERAL DIRECTION OF PEDESTRIAN | LATERAL DIRECTION OF PASSENGER CAR, TRUCK, AND BUS |

FIG. 7

| SCENE | OBJECT RECOGNITION INFORMATION | OBJECT RECOGNITION MODEL |
|---|---|---|
| HIGHWAY | REAR OF PASSENGER CAR, TRUCK, AND BUS | OBJECT RECOGNITION MODEL 1 |
| URBAN INTERSECTION, PARKING LOT ENTRANCE/EXIT | FRONT AND REAR OF PEDESTRIAN AND BICYCLE/ LATERAL DIRECTION OF PEDESTRIAN/ LATERAL DIRECTION OF PASSENGER CAR, TRUCK, AND BUS | OBJECT RECOGNITION MODEL 6 |
| URBAN STRAIGHT ROAD | LATERAL DIRECTION OF PEDESTRIAN | OBJECT RECOGNITION MODEL 2 |

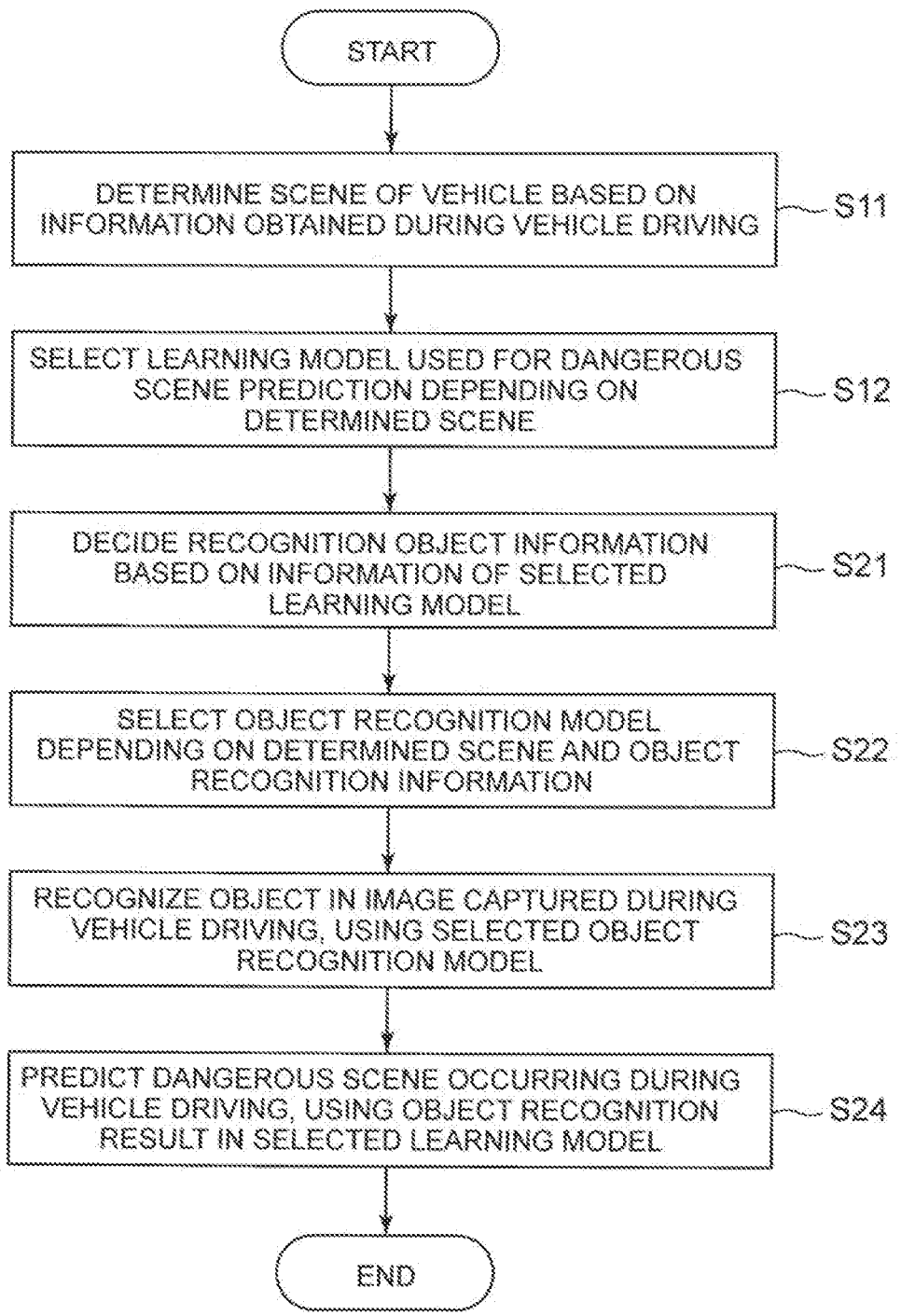

DANGEROUS SCENE PREDICTION DEVICE, DANGEROUS SCENE PREDICTION METHOD, AND DANGEROUS SCENE PREDICTION PROGRAM

This application is a National Stage Entry of PCT/JP2019/036151 filed on Sep. 13, 2019, which claims priority from Japanese Patent Application 2018-212890 filed on Nov. 13, 2018, the contents of all of which are incorporated herein by reference, in their entirety.

TECHNICAL FIELD

The present invention relates to a dangerous scene prediction device, a dangerous scene prediction method, and a dangerous scene prediction program for predicting dangerous scenes expected during driving.

BACKGROUND ART

Automatic driving technology of automating driving by a driver and dangerous scene prediction technology of predicting dangerous scenes during driving are receiving attention in recent years. For example, Patent Literature (PTL) 1 describes a driving assistance device that assists a driver in appropriate driving by providing a driving method from a safe viewpoint to the driver. The driving assistance device described in PTL 1 generates an observation logical expression with literal cost adjusted according to the reliability of recognition regarding observation information as a generation source, and performs hypothetical reasoning for dangerous situations using a knowledge logical expression generated on the basis of knowledge and the observation logical expression.

CITATION LIST

Patent Literature

PTL 1: Japanese Patent Application Laid-Open No. 2017-187848

SUMMARY OF INVENTION

Technical Problem

A computing device that performs various processes during driving has limited resources. Resources for dangerous scene prediction are equally limited. It is therefore often difficult in terms of resources to perform highly accurate processing assuming all dangerous scenes that are predicted. The driving assistance device described in PTL 1 attempts to predict all expected dangers, and accordingly has difficulty in predicting dangerous scenes with high accuracy due to the resources used for prediction.

In view of this, the present invention has an object of providing a dangerous scene prediction device, a dangerous scene prediction method, and a dangerous scene prediction program that can improve the prediction accuracy for dangerous scenes expected during driving while reducing the computation load.

Solution to Problem

A dangerous scene prediction device according to the present invention is a dangerous scene prediction device for predicting a dangerous scene occurring during driving of a vehicle, the dangerous scene prediction device including: a learning model selection/synthesis unit for selecting, from two or more learning models, a learning model used for predicting the dangerous scene, depending on a scene determined based on information obtained during the driving of the vehicle; and a dangerous scene prediction unit for predicting the dangerous scene occurring during the driving of the vehicle, using the selected learning model.

A dangerous scene prediction method according to the present invention is a dangerous scene prediction method for predicting a dangerous scene occurring during driving of a vehicle, the dangerous scene prediction method including: selecting, from two or more learning models, a learning model used for predicting the dangerous scene, depending on a scene determined based on information obtained during the driving of the vehicle; and predicting the dangerous scene occurring during the driving of the vehicle, using the selected learning model.

A dangerous scene prediction program according to the present invention is a dangerous scene prediction program for use in a computer for predicting a dangerous scene occurring during driving of a vehicle, the dangerous scene prediction program causing the computer to execute: a learning model selection/synthesis process of selecting, from two or more learning models, a learning model used for predicting the dangerous scene, depending on a scene determined based on information obtained during the driving of the vehicle; and a dangerous scene prediction process of predicting the dangerous scene occurring during the driving of the vehicle, using the selected learning model.

Advantageous Effects of Invention

According to the present invention, the prediction accuracy for dangerous scenes expected during driving can be improved while reducing the computation load.

BRIEF DESCRIPTION OF DRAWINGS

FIG. 1 It is a block diagram depicting an example of the structure of Exemplary Embodiment 1 of a dangerous scene prediction device according to the present invention.

FIG. 2 It is an explanatory diagram depicting an example of learning models defined for different scenes.

FIG. 6 It is an explanatory diagram depicting an example of the relationship between learning models and recognition object information.

FIG. 7 It is an explanatory diagram depicting an example of object recognition models defined for different scenes and recognition object information.

FIG. 8 It is a flowchart depicting an example of the operation of the dangerous scene prediction device in Exemplary Embodiment 2.

DESCRIPTION OF EMBODIMENT

Figure 3:
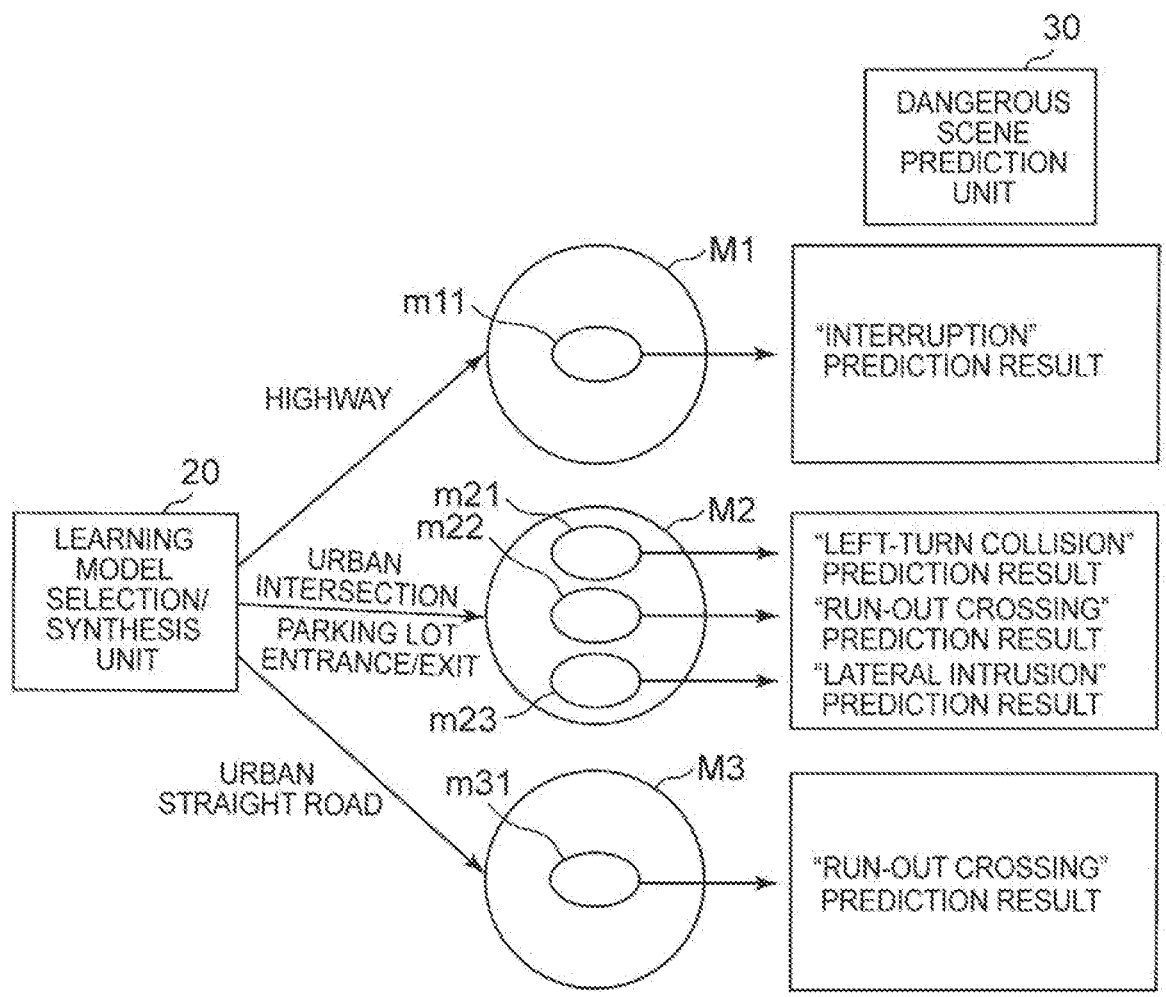
FIG. 3 It is an explanatory diagram depicting an example of a process of selecting a learning model and outputting a dangerous scene prediction result.

Exemplary embodiments of the present invention will be described below, with reference to the drawings. A dangerous scene prediction device according to the present invention predicts a dangerous scene that may occur during vehicle driving using a learning model. Each learning model used in the present invention is a model for predicting whether each dangerous scene expected during vehicle driving occurs or the degree of occurrence of each dangerous scene, and is learned beforehand based on observed data. Examples of dangerous scenes predicted include interruption prediction, left-turn collision prediction, run-out crossing prediction, lateral intrusion prediction, and run-out crossing prediction.

Exemplary Embodiment 1

FIG. 1 is a block diagram depicting an example of the structure of Exemplary Embodiment 1 of a dangerous scene prediction device according to the present invention. A dangerous scene prediction device 100 in this exemplary embodiment includes a scene determination unit 10, a learning model selection/synthesis unit 20, a dangerous scene prediction unit 30, and a storage unit 90.

The storage unit 90 stores a plurality of learning models used by the below-described dangerous scene prediction unit 30. The storage unit 90 may also store various information necessary for the operation of the dangerous scene prediction device 100. The storage unit 90 is implemented, for example, by a magnetic disk or the like.

The scene determination unit 10 receives input of information acquired by various sensors for detecting the state of the vehicle. Examples of the sensors for detecting the state of the vehicle include a GPS (global positioning system) receiver that acquires position information, millimeter wave radar that detects millimeter wave information, LiDAR (laser imaging detection and ranging) that acquires the distance to an object, and a camera that captures a surrounding image.

The scene determination unit 10 determines the scene of the vehicle based on information obtained during vehicle driving, such as the input information of the sensors. Herein, the scene denotes the external environment surrounding the vehicle. Examples of the scene include scenes where the vehicle is running (highway, urban intersection, parking lot entrance/exit, urban straight road, etc.). The scene determined in this exemplary embodiment is not limited to being expressed so as to be interpretable by humans as mentioned above, and may be expressed, for example, by a feature vector representing the external environment. In the following, the operation of the dangerous scene prediction device in this exemplary embodiment will be described using specific scenes as an example, for ease of explanation.

The scene determination unit 10 determines the scene by any method. The scene determination unit 10 may determine the scene based on a rule, or determine the scene using a discriminant model for discriminating the likelihood of each scene. For example, the scene determination unit 10 may determine the current running location (e.g. highway, shopping street, etc.) based on map information given beforehand and position information acquired by GPS. The scene determination unit 10 may hold a scene discriminant model generated by machine learning beforehand based on acquirable sensor information, and determine the scene based on the received sensor information.

The learning model selection/synthesis unit 20 selects a learning model used for dangerous scene prediction from two or more learning models, depending on the determined scene. For example, a learning model to be selected for each scene may be defined beforehand according to the feature of the learning model, and the learning model selection/synthesis unit 20 may select a learning model corresponding to the determined scene. The learning model used in this embodiment may be in any form, and is, for example, a neural network.

FIG. 2 is an explanatory diagram depicting an example of learning models defined for different scenes. In the example depicted in FIG. 2, "highway", "urban intersection" or "parking lot entrance/exit", and "urban straight road" are assumed as scenes. On the "highway", an interruption in front of the vehicle is assumed as a dangerous scene. Hence, in the example depicted in FIG. 2, the scene "highway" is associated with a learning model for performing interruption prediction. At the "urban intersection" or "parking lot entrance/exit", a plurality of dangerous scenes (left-turn collision, run-out crossing, and lateral intrusion) are assumed. Hence, in the example depicted in FIG. 2, the scene "urban intersection" or "parking lot entrance/exit" is associated with a model synthesizing learning models for performing left-turn collision prediction, run-out crossing prediction, and lateral intrusion prediction. The same applies to the scene "urban straight road".

The learning model selection/synthesis unit 20 can select the learning model corresponding to the scene determined by the scene determination unit 10, based on the correspondence relationship between the scene and the learning model defined as depicted in FIG. 2. In the case where the determination result by the scene determination unit 10 includes the probability of the scene, the learning model selection/synthesis unit 20 may select the learning model corresponding to the scene, and associate the selected learning model with the probability of the scene.

The dangerous scene prediction unit 30 predicts a dangerous scene occurring during vehicle driving, using the selected learning model. Specifically, the dangerous scene prediction unit 30 predicts the dangerous scene occurring during vehicle driving based on object position information acquired from the foregoing sensor such as LiDAR or millimeter wave information, and outputs a dangerous scene prediction result. The dangerous scene prediction result is information indicating whether each dangerous scene occurs or the degree of occurrence of each dangerous scene, and may be binary information of 0 or 1. The dangerous scene prediction result may be probability information indicating the likelihood of the danger. Based on the dangerous scene prediction result, for example, whether the vehicle is to issue a warning against a predicted interruption or run-out is decided.

For example, in the case where the learning model is associated with the probability of the scene, the dangerous scene prediction unit 30 may adjust whether the dangerous scene occurs or the degree of occurrence depending on the probability.

FIG. 3 is an explanatory diagram depicting an example of a process of selecting a learning model and outputting a dangerous scene prediction result. The example depicted in FIG. 3 relates to a process of selecting a learning model defined in the example depicted in FIG. 2 and outputting a dangerous scene prediction result. Models M1 to M3 depicted in FIG. 3 are, for example, a neural network.

For example, in the case where the scene is determined as "urban intersection", the learning model selection/synthesis unit 20 selects the model M2 synthesizing a learning model m21 for performing left-turn collision prediction, a learning model m22 for performing run-out crossing prediction, and a learning model m23 for performing lateral intrusion prediction. The dangerous scene prediction unit 30 then predicts each dangerous scene using the model M2, and outputs the occurrence probability (e.g. 0 to 1) of each dangerous scene of left-turn collision, run-out crossing, and lateral intrusion.

For example, in the case where the scene is determined as "highway", the learning model selection/synthesis unit 20 selects the model M1 including a learning model m11 for performing interruption prediction. In the case where the scene is determined as "urban straight road", the learning model selection/synthesis unit 20 selects the model M3 including a learning model m31 for performing run-out crossing prediction. The dangerous scene prediction result is the same as in the case of the model M2 as mentioned above.

The scene determination unit 10, the learning model selection/synthesis unit 20, and the dangerous scene prediction unit 30 are implemented by a CPU of a computer operating according to a program (dangerous scene prediction program). For example, the program may be stored in the storage unit 90 in the dangerous scene prediction device 100, with the CPU reading the program and, according to the program, operating as the scene determination unit 10, the learning model selection/synthesis unit 20, and the dangerous scene prediction unit 30. The scene determination unit 10, the learning model selection/synthesis unit 20, and the dangerous scene prediction unit 30 may each be implemented by dedicated hardware.

Figure 4:
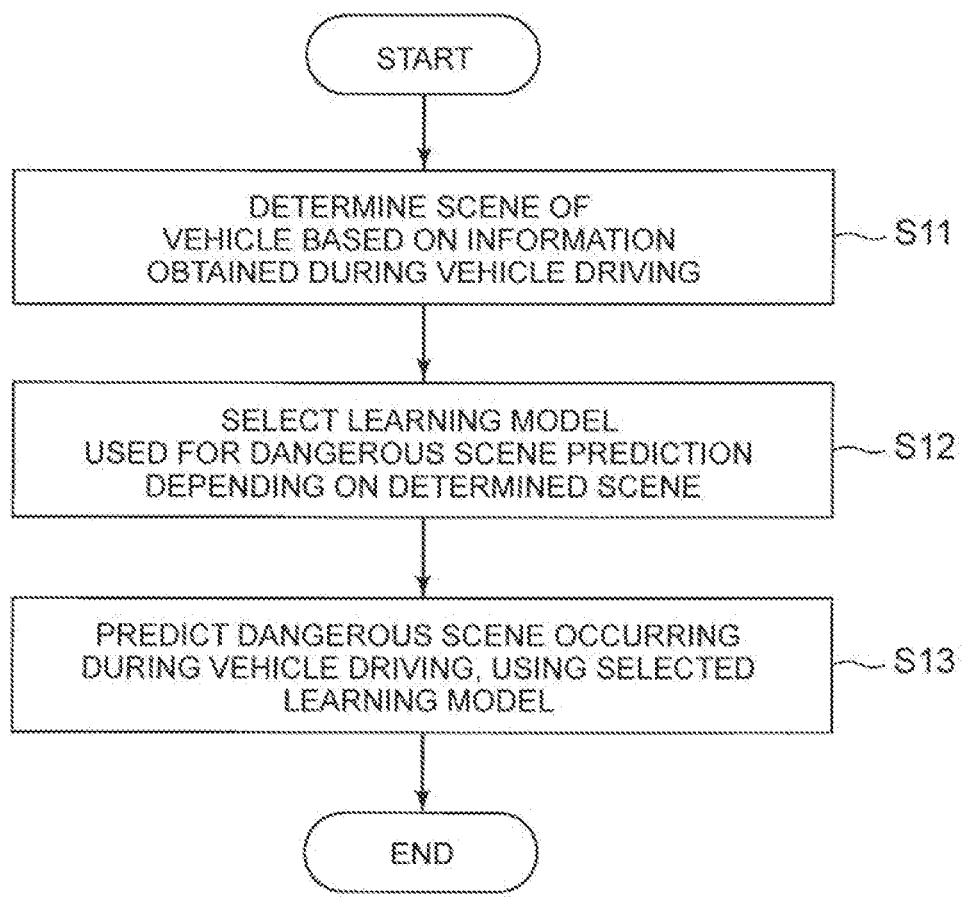
FIG. 4 It is a flowchart depicting an example of the operation of the dangerous scene prediction device in Exemplary Embodiment 1.

The operation of the dangerous scene prediction device 100 in this exemplary embodiment will be described below. FIG. 4 is a flowchart depicting an example of the operation of the dangerous scene prediction device 100 in this exemplary embodiment. The scene determination unit 10 determines the scene of the vehicle, for example based on object position information acquired from sensor information obtained during vehicle driving (step S11). The learning model selection/synthesis unit 20 selects a learning model used for dangerous scene prediction from two or more learning models, depending on the determined scene (step S12). The dangerous scene prediction unit 30 predicts a dangerous scene occurring during vehicle driving, using the selected learning model (step S13).

As described above, in this exemplary embodiment, the learning model selection/synthesis unit 20 selects a learning model used for dangerous scene prediction from two or more learning models, depending on a scene determined based on information obtained during vehicle driving. The dangerous scene prediction unit 30 predicts a dangerous scene occurring during vehicle driving, using the selected learning model. Thus, the prediction accuracy for dangerous scenes expected during driving can be improved while reducing the computation load.

That is, in this exemplary embodiment, the learning model selection/synthesis unit 20 selects a learning model necessary for dangerous scene prediction suitable for the scene, and the dangerous scene prediction unit 30 predicts a dangerous scene using only the learning model. Therefore, highly accurate dangerous scene prediction can be achieved while reducing the computation amount.

Exemplary Embodiment 2

Exemplary Embodiment 2 of a dangerous scene prediction device according to the present invention will be described below. Exemplary Embodiment 1 describes a method of predicting a dangerous scene using detected object position information. Exemplary Embodiment 2 describes a method of predicting a dangerous scene using a result of recognizing a detected object.

Figure 5:
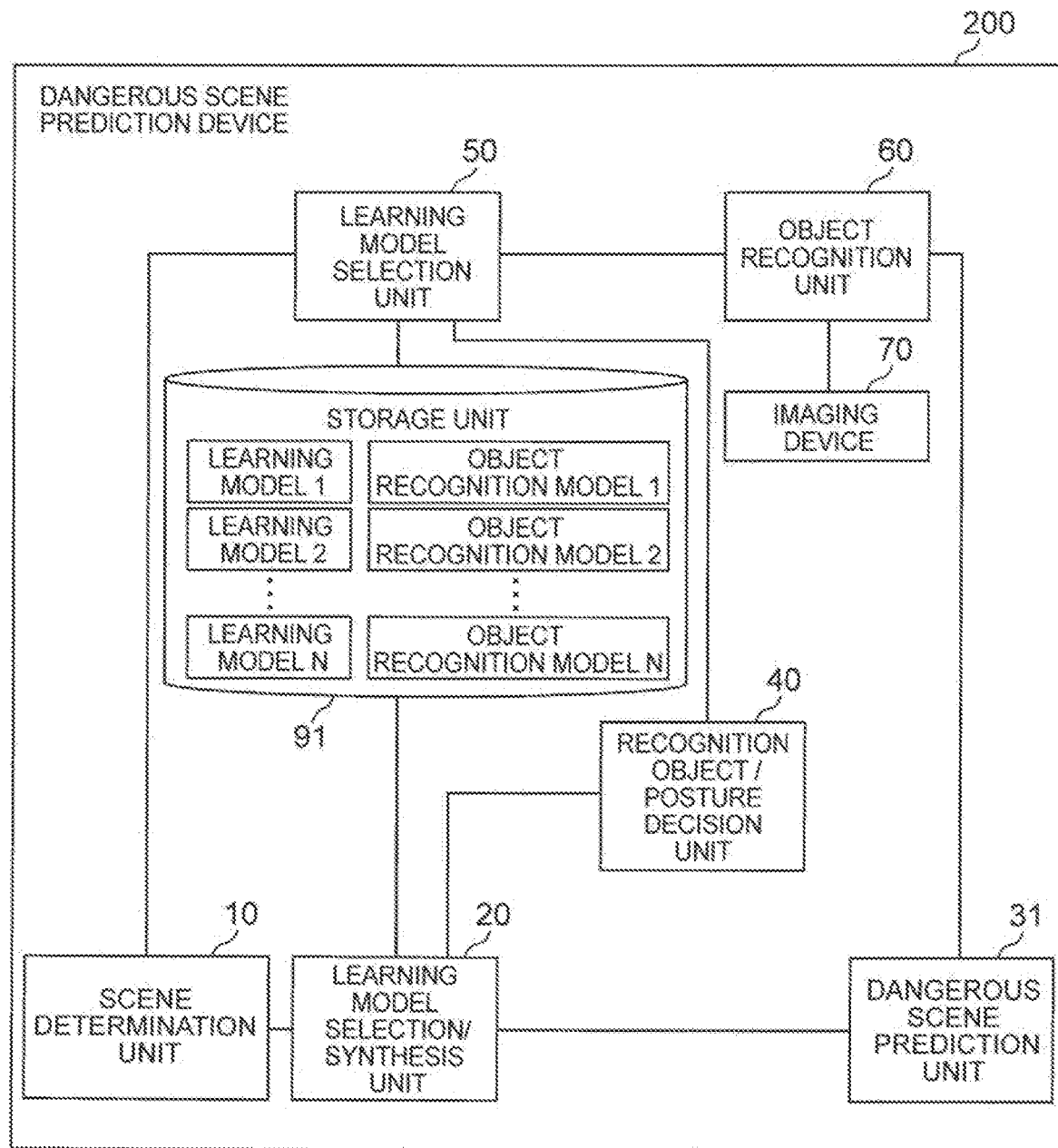
FIG. 5 It is a block diagram depicting an example of the structure of Exemplary Embodiment 2 of a dangerous scene prediction device according to the present invention.

FIG. 5 is a block diagram depicting an example of the structure of Exemplary Embodiment 2 of a dangerous scene prediction device according to the present invention. A dangerous scene prediction device 200 in this exemplary embodiment includes the scene determination unit 10, the learning model selection/synthesis unit 20, a dangerous scene prediction unit 31, a recognition object/posture decision unit 40, a learning model selection unit 50, an object recognition unit 60, an imaging device 70, and a storage unit 91. The scene determination unit 10 and the learning model selection/synthesis unit 20 are the same as those in Exemplary Embodiment 1.

The scene determination unit 10, the learning model selection/synthesis unit 20, and the dangerous scene prediction unit 31 may be implemented by a device different from the recognition object/posture decision unit 40, the learning model selection unit 50, and the object recognition unit 60.

The storage unit 91 stores a plurality of learning models used by the dangerous scene prediction unit 31, as with the storage unit 90 in Exemplary Embodiment 1. The storage unit 91 in this exemplary embodiment also stores a plurality of learning models (hereafter referred to as "object recognition models") used for object recognition by the below-described the object recognition unit 60. The storage unit 91 may store various information necessary for the operation of the dangerous scene prediction device 200. The storage unit 91 is implemented, for example, by a magnetic disk or the like.

The recognition object/posture decision unit 40 decides information (hereafter referred to as "recognition object information") about an object subjected to recognition, based on information of a learning model selected by the learning model selection/synthesis unit 20. Specifically, the recognition object/posture decision unit 40 decides the recognition object information necessary in the case of performing dangerous scene prediction using the learning model selected by the learning model selection/synthesis unit 20. The recognition object information may include not only information indicating the recognition object itself but also information indicating the part of the object subjected to recognition (hereafter referred to as "posture of object").

The recognition object information is defined beforehand for each learning model for performing dangerous scene prediction, as an important recognition object when performing dangerous scene prediction. FIG. 6 is an explanatory diagram depicting an example of the relationship between learning models and recognition object information. In the example depicted in FIG. 6, each prediction model for performing dangerous scene prediction is associated with an important recognition object and posture. For example, in the case of predicting vehicle interruption as a dangerous scene, information of the rear of a vehicle (passenger car, truck, and bus) can be regarded as an important recognition object and posture, as depicted in (1) in FIG. 6. Hence, a model (interruption prediction model) for performing vehicle interruption prediction is associated with "rear of vehicle (passenger car, truck, and bus)" as an important recognition object and posture. The same applies to other prediction models.

The learning model selection unit 50 selects an object recognition model used for object recognition from two or more object recognition models, depending on the scene determined by the scene determination unit 10 and the recognition object information decided by the recognition object/posture decision unit 40. For example, an object recognition model to be selected for each scene and recognition object information may be defined beforehand, and the learning model selection unit 50 may select an object recognition model corresponding to the determined scene. The object recognition model used in this embodiment may be in any form, and is, for example, a neural network.

FIG. 7 is an explanatory diagram depicting an example of object recognition models defined for different scenes and recognition object information. In the example depicted in FIG. 7, "highway", "urban intersection" or "parking lot entrance/exit", and "urban straight road" are assumed as scenes. For example, suppose an object recognition model 1 has high accuracy in object recognition for the rear of a vehicle. In such a case, "highway" and the object recognition model 1 are associated with each other, and the learning model selection unit 50 selects the object recognition model corresponding to the scene determined by the scene determination unit 10 and the recognition object information. The same applies to other scenes.

The imaging device 70 captures an image outside the vehicle during vehicle driving. The timing at which the imaging device 70 captures an image may be any timing during running or stopping. The imaging device 70 may capture an image at predetermined time intervals, or capture an image according to an instruction from the driver or the like or a control device. The imaging device 70 is, for example, a vehicle-mounted camera that captures a landscape outside the vehicle.

The object recognition unit 60 recognizes an object in the image captured by the imaging device 70, using the selected object recognition model. The method whereby the object recognition unit 60 recognizes the object using the learning model is widely known, and accordingly its detailed description is omitted.

The dangerous scene prediction unit 31 predicts a dangerous scene occurring during vehicle driving, using not only the object position information in Exemplary Embodiment 1 but also the object recognition result by the object recognition unit 60 in the selected learning model. The dangerous scene prediction unit 31 may predict the dangerous scene, without using the object recognition result (i.e. using the object recognition result as auxiliary information).

The scene determination unit 10, the learning model selection/synthesis unit 20, the dangerous scene prediction unit 31, the recognition object/posture decision unit 40, the learning model selection unit 50, and the object recognition unit 60 are implemented by a CPU of a computer operating according to a program (dangerous scene prediction program). The scene determination unit 10, the learning model selection/synthesis unit 20, the dangerous scene prediction unit 31, the recognition object/posture decision unit 40, the learning model selection unit 50, the object recognition unit 60 may each be implemented by dedicated hardware.

The operation of the dangerous scene prediction device 200 in this exemplary embodiment will be described below. FIG. 8 is a flowchart depicting an example of the operation of the dangerous scene prediction device 200 in this exemplary embodiment. The method whereby the scene determination unit 10 determines the scene of the vehicle and the learning model used for dangerous scene prediction is selected is the same as the process from steps S11 to S12 in FIG. 4.

Figure 9:
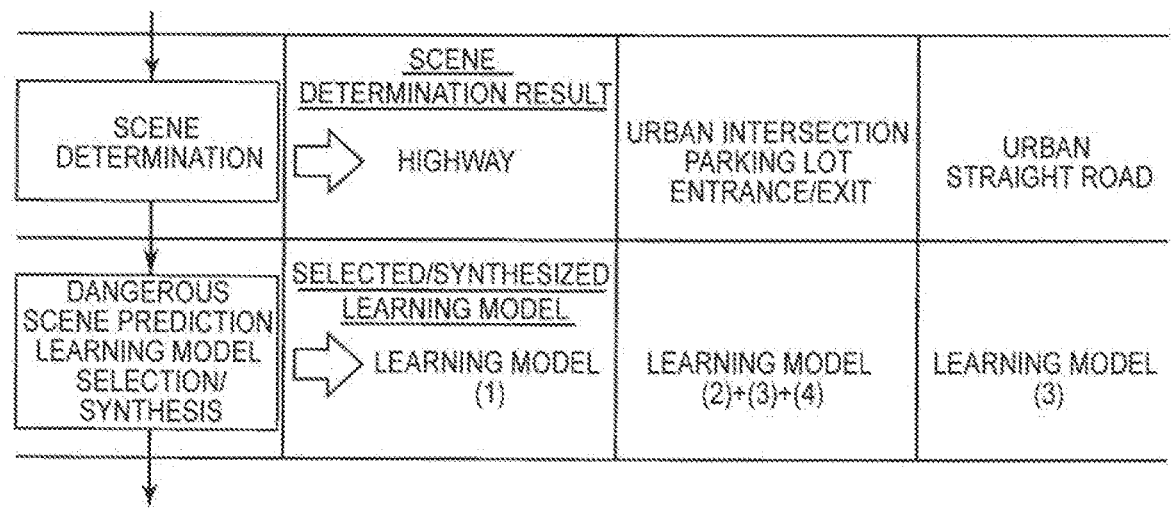
FIG. 9 It is an explanatory diagram depicting an example of the relationship between scene determination results and selected learning models.

FIG. 9 is an explanatory diagram depicting an example of the relationship between scene determination results and selected learning models. For example, in the case where the scene determination unit 10 determines the scene as "highway", the learning model selection/synthesis unit 20 selects the learning model (1) depicted in FIG. 6. For example, in the case where the scene determination unit 10 determines the scene as "urban intersection" or "parking lot entrance/exit", the learning model selection/synthesis unit 20 selects the learning model (2), the learning model (3) and the learning model (4) depicted in FIG. 6. That is, the learning model selection/synthesis unit 20 selects and synthesizes the plurality of learning models. For example, in the case where the scene determination unit 10 determines the scene as "urban straight road", the learning model selection/synthesis unit 20 selects the learning model (3) depicted in FIG. 6.

The recognition object/posture decision unit 40 decides recognition object information based on information of the learning model selected by the learning model selection/synthesis unit 20 (step S21 in FIG. 8). The learning model selection unit 50 selects an object recognition model depending on the determined scene and the recognition object information (step S22). The object recognition unit 60 recognizes an object in an image captured during vehicle driving, using the selected object recognition model (step S23). The dangerous scene prediction unit 31 predicts a dangerous scene occurring during vehicle driving, using the object recognition result by the object recognition unit 60 in the selected learning model (step S24).

As described above, in this exemplary embodiment, the recognition object/posture decision unit 40 decides recognition object information based on information of a selected learning model. The learning model selection unit 50 selects an object recognition model depending on the determined scene and the recognition object information. The object recognition unit 60 recognizes an object in an image captured during vehicle driving, using the selected object recognition model. The dangerous scene prediction unit 31 predicts a dangerous scene occurring during vehicle driving, using the object recognition result in the selected learning model.

Thus, in addition to the effects in Exemplary Embodiment 1, the object recognition model can be selected based on the recognition object and posture necessary for the dangerous scene prediction model, so that the dangerous scene prediction accuracy can be improved.

Exemplary Embodiment 3

Exemplary Embodiment 3 of a dangerous scene prediction device according to the present invention will be described below. This exemplary embodiment describes a method of selecting a learning model to be used, based on the computation amount of the dangerous scene prediction process and the object recognition process.

Figure 10:
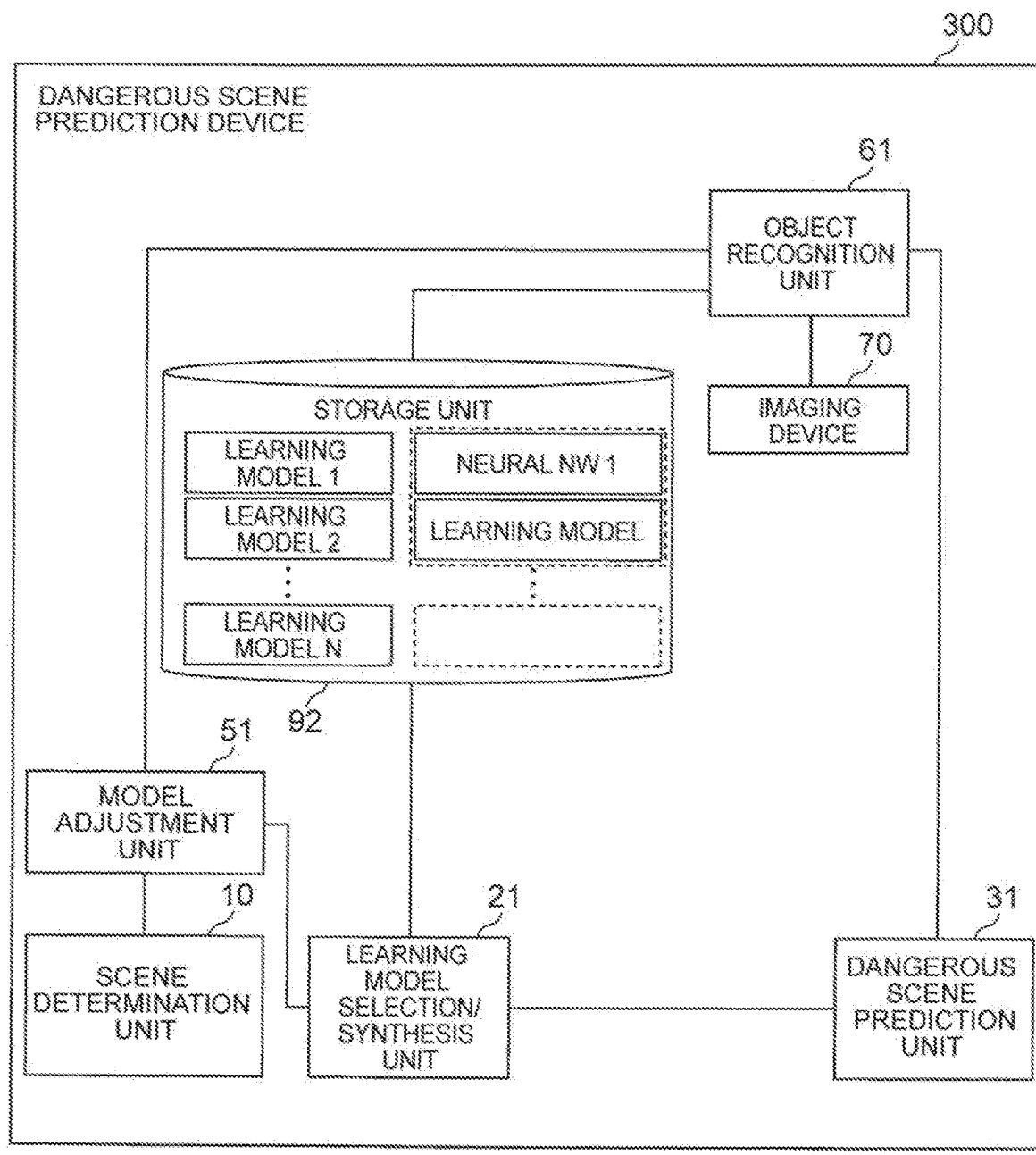
FIG. 10 It is a block diagram depicting an example of the structure of Exemplary Embodiment 3 of a dangerous scene prediction device according to the present invention.

FIG. 10 is a block diagram depicting an example of the structure of Exemplary Embodiment 3 of a dangerous scene prediction device according to the present invention. A dangerous scene prediction device 300 in this exemplary embodiment includes the scene determination unit 10, a learning model selection/synthesis unit 21, the dangerous scene prediction unit 31, a model adjustment unit 51, an object recognition unit 61, the imaging device 70, and a storage unit 92. The scene determination unit 10, the dangerous scene prediction unit 31, and the imaging device 70 are the same as those in Exemplary Embodiment 2.

The storage unit 92 stores a plurality of learning models used by the dangerous scene prediction unit 31, as with the storage unit 90 in Exemplary Embodiment 1. The storage unit 92 in this exemplary embodiment also stores a plurality of neural networks (hereafter referred to as "neural NW") used for object recognition by the below-described the object recognition unit 61, and learning models corresponding to the neural NWs. The storage unit 92 may store various information necessary for the operation of the dangerous scene prediction device 300. The storage unit 92 is implemented, for example, by a magnetic disk or the like.

Each neural NW used in this exemplary embodiment is a model for performing inference (type determination) of object recognition by machine learning, and performs inference (type determination) using weights and biases representing the strength of connection between nodes indicated in the corresponding learning model. Since the object recognition accuracy and the computation amount are different between different neural NWs, a plurality of types of neural NWs and corresponding learning models are prepared beforehand depending on the computation amount in this exemplary embodiment.

The model adjustment unit 51 decides a neural NW used for object recognition by the below-described object recognition unit 61 and a learning model used for dangerous scene prediction by the dangerous scene prediction unit 31, depending on the scene determined by the scene determination unit 10. Here, the model adjustment unit 51 decides the neural NW and the learning model so that the computation amount required for the object recognition process and the dangerous scene prediction process will be less than or equal to the computation amount that is allowed (hereafter referred to as "allowable computation amount").

In the case of object recognition, the change of the computation amount is greater when changing the neural NW than when changing the learning model while fixing the neural NW. Accordingly, in this exemplary embodiment, the model adjustment unit 51 controls not the learning model but the neural NW.

First, the model adjustment unit 51 decides the process is to be prioritized. Specifically, the model adjustment unit 51 decides the relative priority of the object recognition process and the dangerous scene prediction process depending on the determined scene. The relative priority may be set beforehand depending on the scene.

For example, in the case of the scene "highway", it is considered that the danger prediction performance is demanded more than the object recognition performance. Hence, for the scene "highway", the priority of the dangerous scene prediction process is set higher than the priority of the object recognition process. For example, in the case of the scene "straight road on shopping street", there are many small objects such as pedestrians, and thus it is considered that the object recognition performance is demanded more than the danger prediction performance. Hence, for the scene "straight road on shopping street", the priority of the object recognition process is set higher than the priority of the dangerous scene prediction process. The model adjustment unit 51 decides the process to be prioritized, based on such setting.

The model adjustment unit 51 then decides a neural NW and a learning model so that the computation amount required for the two processes will be less than or equal to the allowable computation amount, based on the decided priority. In this exemplary embodiment, the computation amount when performing object recognition using each neural NW and the computation amount when performing dangerous scene prediction using each learning model are measured and stored in, for example, the storage unit 92 beforehand. The model adjustment unit 51 decides the neural NW and the learning model so that the computation amount required for the two processes will be less than or equal to the allowable computation amount, based on the computation amount measured beforehand. For example, the computation amount is defined as an index value corresponding to the number of calculation steps such as multiplication and addition in digital signal processing.

Figure 11:
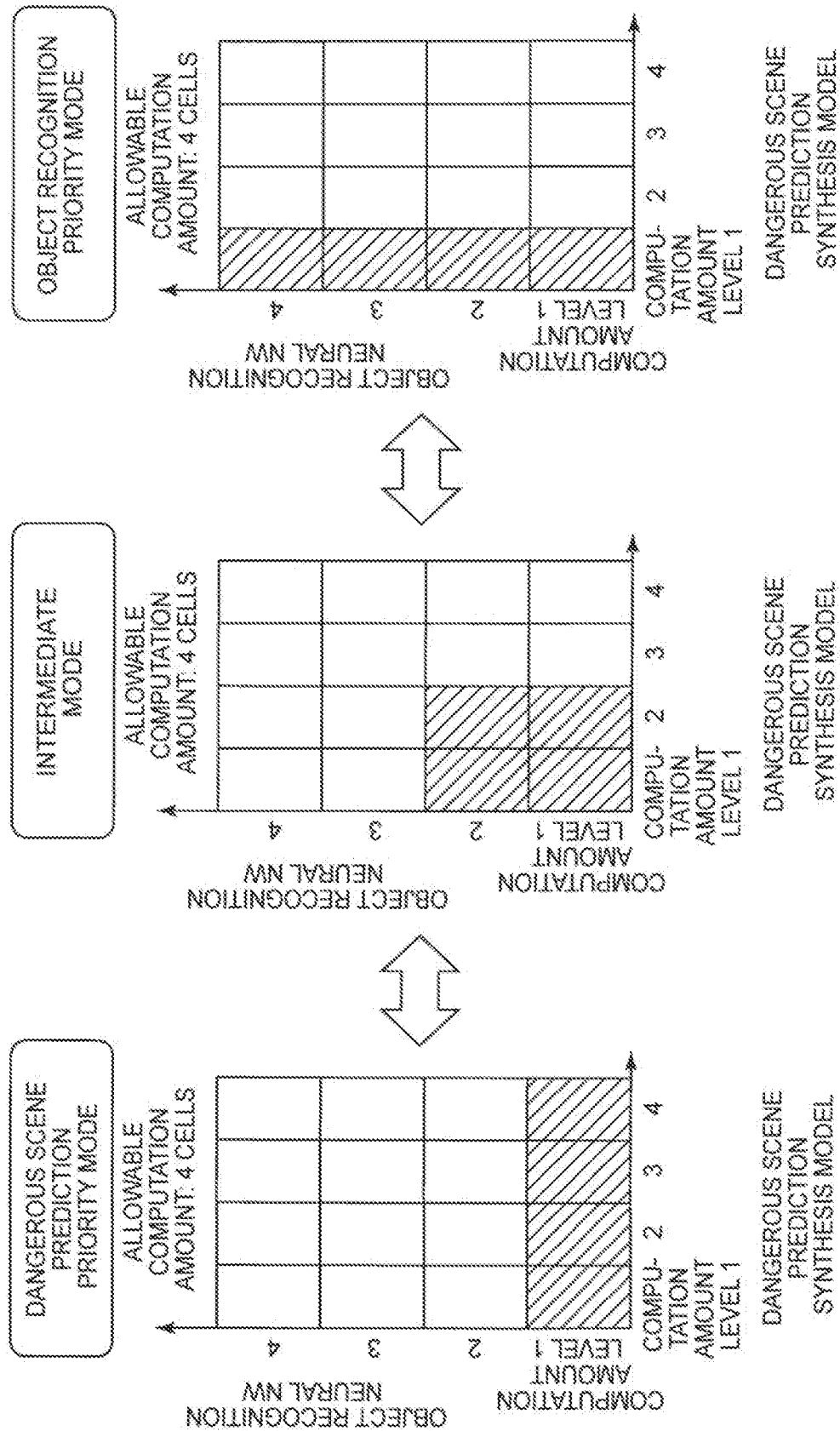
FIG. 11 It is an explanatory diagram depicting an example of a process of deciding a model according to an allowable computation amount.

To describe the process of deciding the neural NW and the learning model based on the computation amount, computation amount levels are defined here. Each computation amount level is an index value defined according to the computation amount. In this example, the minimum level is 1, and the maximum level is 4. FIG. 11 is an explanatory diagram depicting an example of a process of deciding a neural NW and a learning model according to the allowable computation amount.

In the example depicted in FIG. 11, a process corresponding to a scene in which the priority of the dangerous scene prediction process is set higher than the priority of the object recognition process is referred to as "dangerous scene prediction priority mode", and a process corresponding to a scene in which the priority of the object recognition process is set higher than the priority of the dangerous scene prediction process is referred to as "object recognition priority mode". A process intermediate between "dangerous scene prediction priority mode" and "object recognition priority mode" is referred to as "intermediate mode".

In the example depicted in FIG. 11, a graph is assumed in which the horizontal axis represents the computation amount when using a learning model generated as a dangerous scene prediction synthesis model and the vertical axis represents the computation amount when using a neural NW, where 1 cell of the grid in each mode represents 1 computation amount. In the example depicted in FIG. 11, the allowable computation amount is 4 cells.

For example, in the "dangerous scene prediction priority mode", the priority of the dangerous scene prediction process is higher than the priority of the object recognition process, and accordingly the model adjustment unit 51 decides the computation amount level of the learning model to be high and the computation amount level of the neural NW to be low. For example, in the case where the computation amount level of the learning model is decided to be 4, the computation amount level of the neural NW is decided to be 1 based on the allowable computation amount (4 cells).

In the "object recognition priority mode", the priority of the object recognition process is higher than the priority of the dangerous scene prediction process, and accordingly the model adjustment unit 51 decides the computation amount level of the learning model to be low and the computation amount level of the neural NW to be high. For example, in the case where the computation amount level of the neural NW is decided to be 4, the computation amount level of the learning model is decided to be 1 based on the allowable computation amount (4 cells).

In the "intermediate mode", the priority of the object recognition process and the priority of the dangerous scene prediction process are equal, and accordingly the model adjustment unit 51 decides the computation amount level of the learning model and the computation amount level of the neural NW to be equal. For example, in the case where the computation amount level of the neural NW is decided to be 2, the computation amount level of the learning model is decided to be 2 based on the allowable computation amount (4 cells).

The object recognition unit 61 recognizes an object in an image captured during vehicle driving, using the selected neural NW. Since the method of recognizing an image using a neural NW is widely known, its detailed description is omitted.

The learning model selection/synthesis unit 21 selects a learning model used for dangerous scene prediction, based on the selected learning model. The dangerous scene prediction unit 31 predicts a dangerous scene occurring during vehicle driving, using the object recognition result by the object recognition unit 61 in the selected learning model.

The scene determination unit 10, the learning model selection/synthesis unit 21, the dangerous scene prediction unit 31, the model adjustment unit 51, and the object recognition unit 61 are implemented by a CPU of a computer operating according to a program (dangerous scene prediction program). The scene determination unit 10, the learning model selection/synthesis unit 21, the dangerous scene prediction unit 31, the model adjustment unit 51, the object recognition unit 61 may each be implemented by dedicated hardware.

Figure 12:
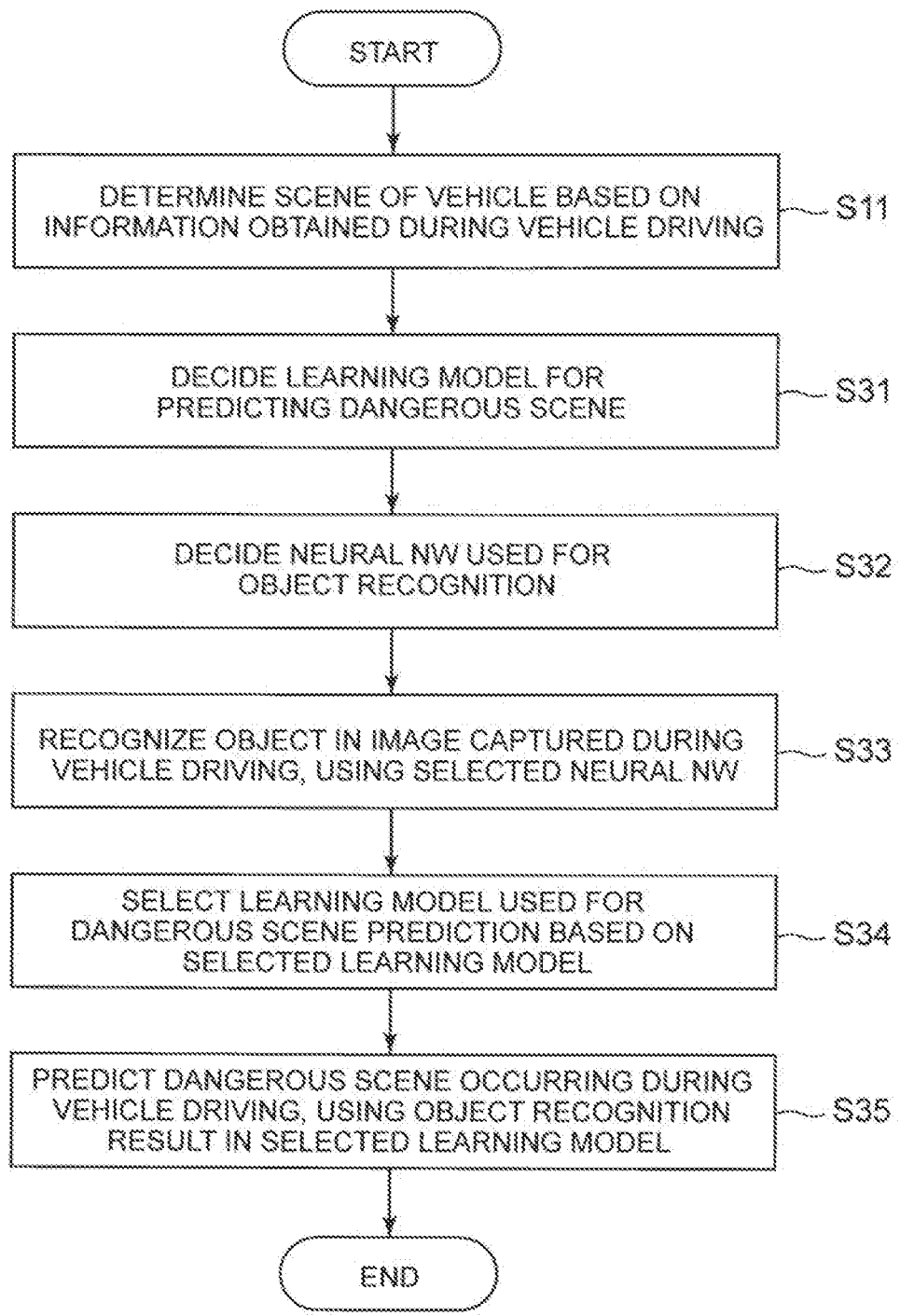
FIG. 12 It is a flowchart depicting an example of the operation of the dangerous scene prediction device in Exemplary Embodiment 3.

The operation of the dangerous scene prediction device 300 in this exemplary embodiment will be described below. FIG. 12 is a flowchart depicting an example of the operation of the dangerous scene prediction device 300 in this exemplary embodiment. The flowchart in FIG. 12 depicts a process in the case where a learning model for performing dangerous scene prediction is prioritized. The process by which the scene determination unit 10 determines the scene of the vehicle is the same as the process in step S11 in FIG. 4.

The model adjustment unit 51 first decides a learning model for performing dangerous scene prediction (step S31). The model adjustment unit 51 decides an object recognition neural NW, based on the computation amount (computation amount level) required for the dangerous scene prediction process using the decided learning model and the allowable computation amount set beforehand (step S32).

The object recognition unit 61 recognizes an object in an image captured during vehicle driving, using the selected neural NW (step S33). The learning model selection/synthesis unit 21 selects a learning model used for dangerous scene prediction based on the selected learning model (step S34). The dangerous scene prediction unit 31 predicts a dangerous scene occurring during vehicle driving, using the object recognition result by the object recognition unit 61 in the selected learning model (step S35).

Figure 13:
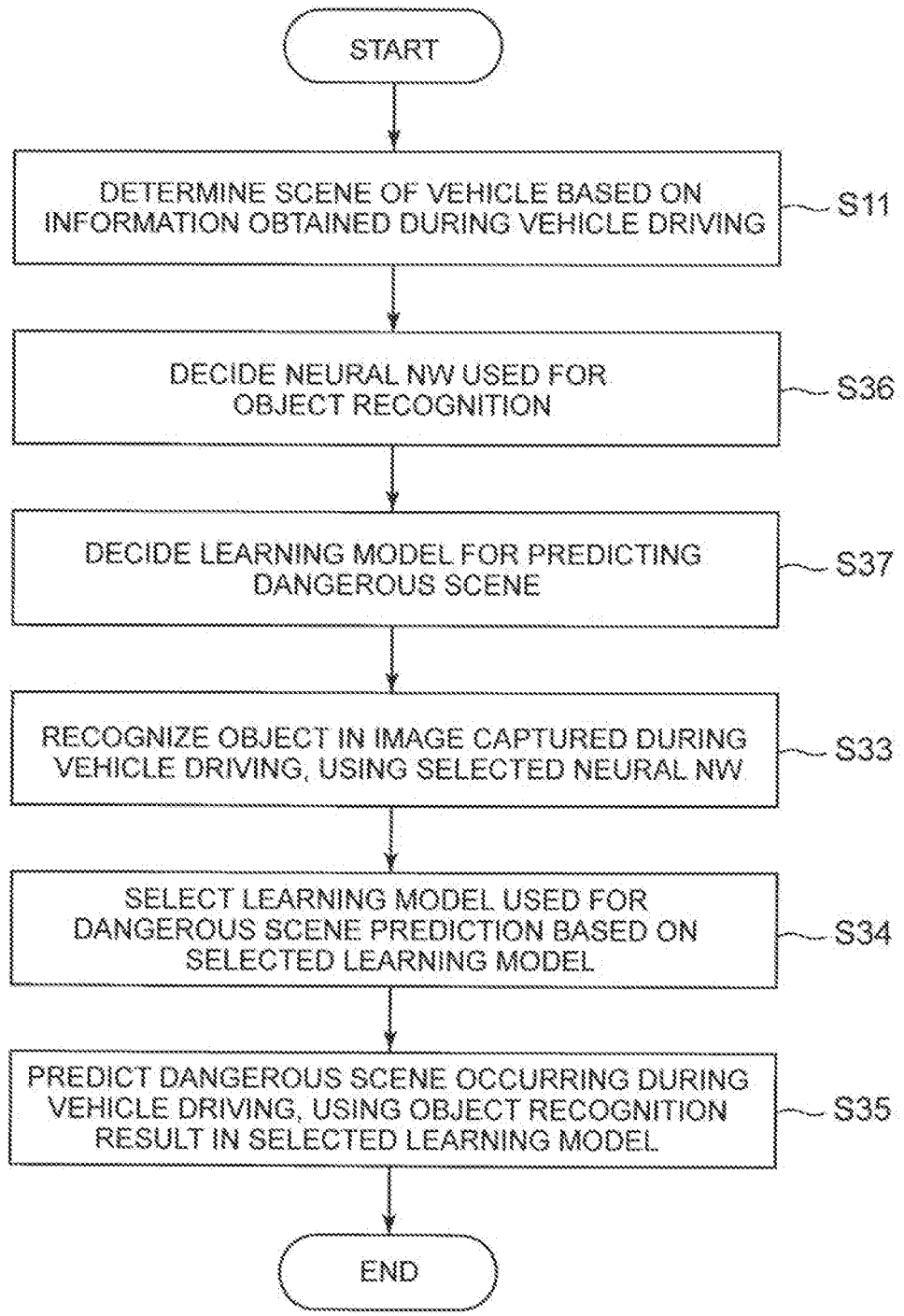
FIG. 13 It is a flowchart depicting another example of the operation of the dangerous scene prediction device in Exemplary Embodiment 3.

FIG. 13 is a flowchart depicting another example of the operation of the dangerous scene prediction device 300 in this exemplary embodiment. The flowchart in FIG. 13 depicts a process in the case where a neural NW used for object recognition is prioritized. The process by which the scene determination unit 10 determines the scene of the vehicle is the same as the process in step S11 in FIG. 12.

The model adjustment unit 51 first decides a neural NW used for object recognition (step S36). The model adjustment unit 51 decides a learning model for performing dangerous scene prediction, based on the computation amount (computation amount level) required for the object recognition process using the decided neural NW and the allowable computation amount set beforehand (step S37). The subsequent process until a dangerous scene is predicted is the same as the process in steps S33 to S35 in FIG. 12.

As described above, in this exemplary embodiment, the model adjustment unit 51 decides a neural NW and a learning model so that the computation amount required for the object recognition process and the dangerous scene prediction process will be less than or equal to the allowable computation amount, depending on the determined scene. The object recognition unit 61 recognizes an object in an image captured during vehicle driving, using the selected neural NW. The learning model selection/synthesis unit 21 selects a learning model used for dangerous scene prediction, based on the selected learning model. The dangerous scene prediction unit 31 predicts a dangerous scene occurring during vehicle driving, using the object recognition result by the object recognition unit 61 in the selected learning model.

Thus, in addition to the effects in Exemplary Embodiment 1, dangerous scene prediction can be performed with high accuracy within limited resources by taking into account the computation amount of the neural NW for performing object recognition and the learning model for performing dangerous scene prediction.

Exemplary Embodiment 4

Exemplary Embodiment 4 of a dangerous scene prediction device according to the present invention will be described below. Exemplary Embodiment 3 describes the case where the allowable computation amount is set beforehand. This exemplary embodiment describes a method of deciding the allowable computation amount based on the scene determination result.

Figure 14:
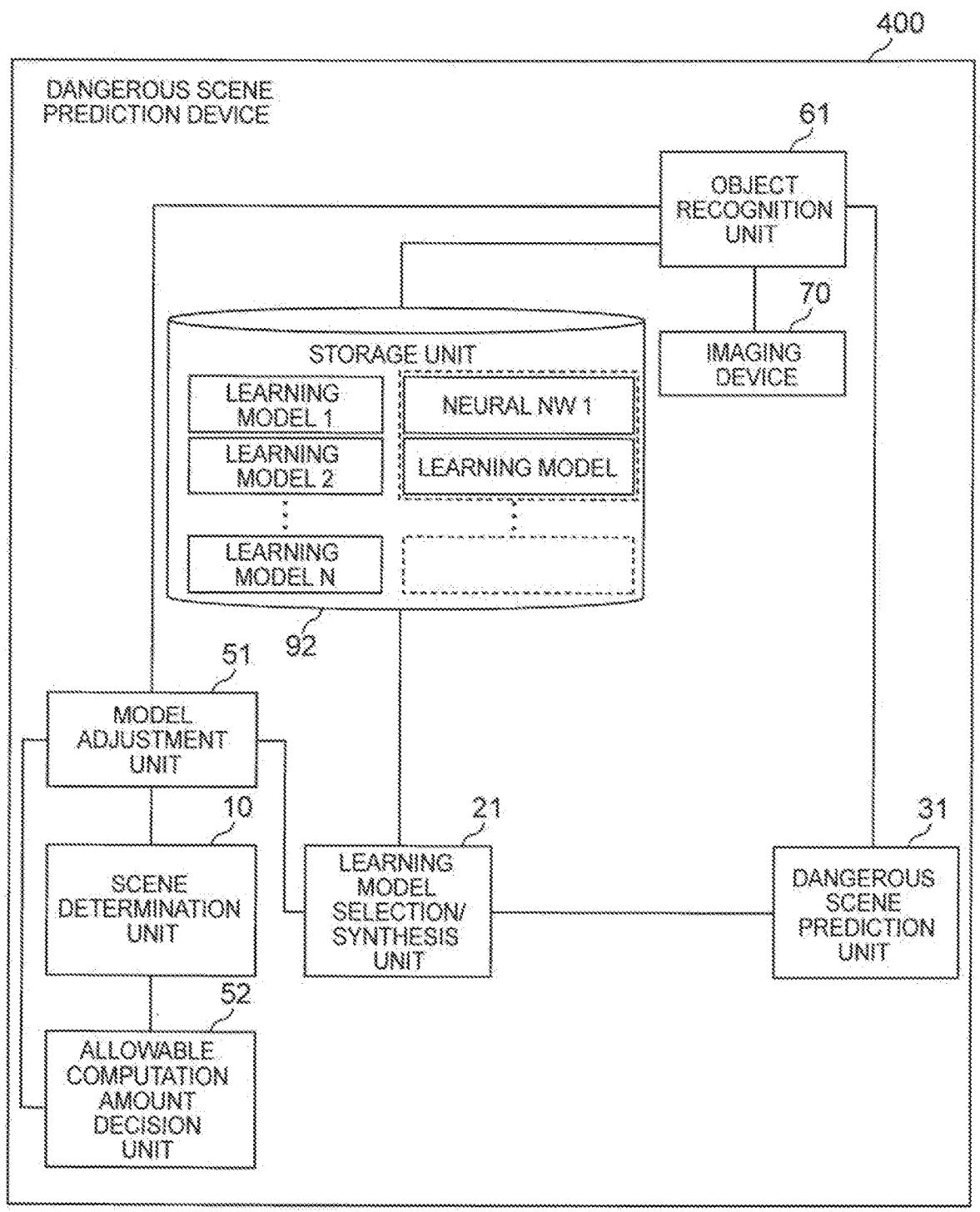
FIG. 14 It is a block diagram depicting an example of the structure of Exemplary Embodiment 4 of a dangerous scene prediction device according to the present invention.

FIG. 14 is a block diagram depicting an example of the structure of Exemplary Embodiment 4 of a dangerous scene prediction device according to the present invention. A dangerous scene prediction device 400 in this exemplary embodiment includes the scene determination unit 10, the learning model selection/synthesis unit 21, the dangerous scene prediction unit 31, the model adjustment unit 51, an allowable computation amount decision unit 52, the object recognition unit 61, the imaging device 70, and the storage unit 92. That is, the dangerous scene prediction device 400 in this exemplary embodiment differs from the dangerous scene prediction device 300 in Exemplary Embodiment 3 in that the allowable computation amount decision unit 52 is further included. The other structure is the same as that in Exemplary Embodiment 3.

The allowable computation amount decision unit 52 decides an allowable computation amount depending on the scene determined by the scene determination unit 10. Specifically, the allowable computation amount decision unit 52 decides to increase the allowable computation amount in the case where the allowable time of dangerous scene prediction (hereafter referred to as "danger prediction time") for the determined scene is long, and decrease the allowable computation amount in the case where the danger prediction time for the scene is short. For example, the allowable computation amount is set beforehand depending on the scene, and the allowable computation amount decision unit 52 specifies the allowable computation amount corresponding to the determined scene.

Figure 15:
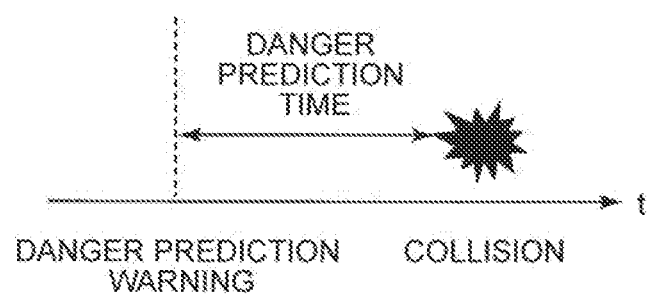
FIG. 15 It is an explanatory diagram depicting an example of a danger prediction time.

FIG. 15 is an explanatory diagram depicting an example of the danger prediction time. For example, in the case where the dangerous scene is "collision", the danger prediction time corresponds to the time from the issuance of a warning of danger prediction to the collision.

The model adjustment unit 51 decides a neural NW and a learning model so that the computation amount required for each process will be less than or equal to the allowable computation amount decided by the allowable computation amount decision unit 52. The method by which the model adjustment unit 51 decides the model based on the computation amount is the same as that in Exemplary Embodiment 3.

Figure 16:
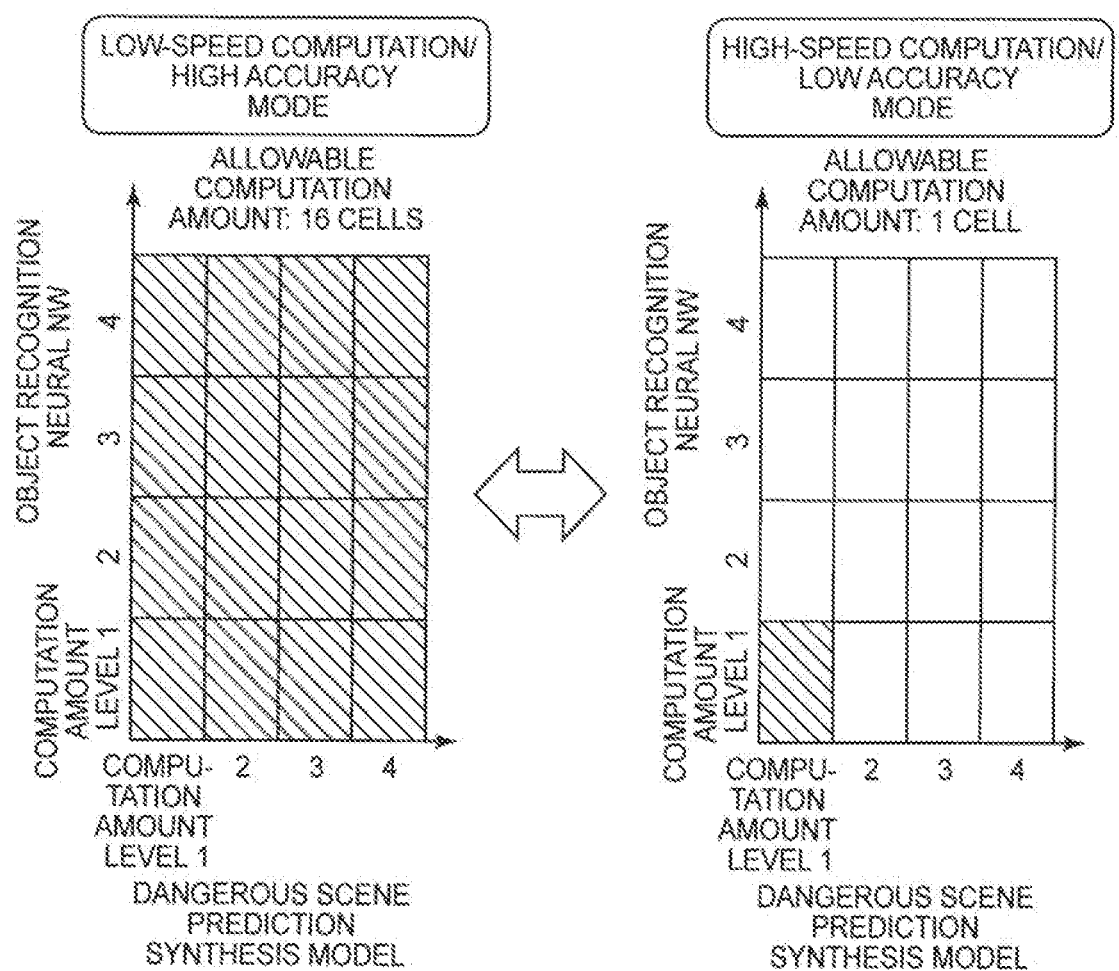
FIG. 16 It is an explanatory diagram depicting another example of a process of deciding a model according to an allowable computation amount.

FIG. 16 is an explanatory diagram depicting another example of a process of deciding a neural NW and a learning model according to the allowable computation amount. FIG. 16 depicts the case where the process is performed in two types of modes ("low-speed computation/high accuracy mode" and "high-speed computation/low accuracy mode") depending on the length of the danger prediction time. The "low-speed computation/high accuracy mode" is an example when the danger prediction time is long (e.g. from 3 sec to less than 10 sec), and "high-speed computation/low accuracy mode" is an example when the danger prediction time is short (e.g. within 3 sec).

The graph depicted in FIG. 16 is a graph in which the horizontal axis represents the computation amount when using a learning model generated as a dangerous scene prediction synthesis model and the vertical axis represents the computation amount when using a neural NW, where 1 cell of the grid represents 1 computation amount, as in the graph depicted in FIG. 11. More computation can be performed for a scene with a long danger prediction time. Accordingly, in the example depicted in FIG. 16, the allowable computation amount for the "low-speed computation/ high accuracy mode" is set to 16 cells. For a scene with a short danger prediction time, on the other hand, the computation time is more limited. Accordingly, in the example depicted in FIG. 16, the allowable computation amount for the "high-speed computation/low accuracy mode" is set to 1 cell.

In this case, in the "low-speed computation/high accuracy mode", the computation amount level of each of the neural NW and the learning model can be set to 4. In the "high-speed computation/low accuracy mode", the computation amount level of each of the neural NW and the learning model can be set to only 1.

The scene determination unit 10, the learning model selection/synthesis unit 21, the dangerous scene prediction unit 31, the model adjustment unit 51, the allowable computation amount decision unit 52, and the object recognition unit 61 are implemented by a CPU of a computer operating according to a program (dangerous scene prediction program). The scene determination unit 10, the learning model selection/synthesis unit 21, the dangerous scene prediction unit 31, the model adjustment unit 51, the allowable computation amount decision unit 52, and the object recognition unit 61 may each be implemented by dedicated hardware.

Figure 17:
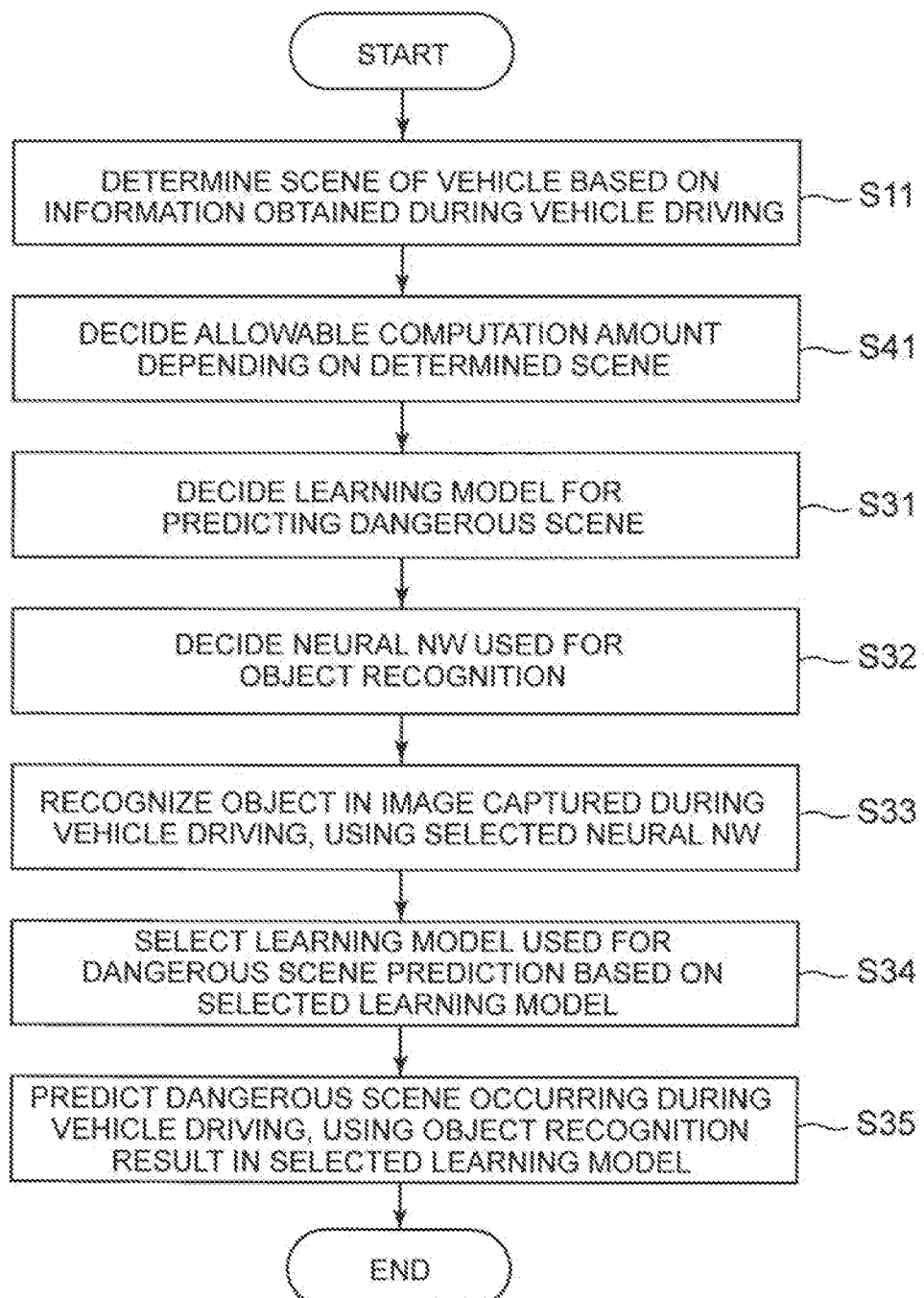
FIG. 17 It is a flowchart depicting an example of the operation of the dangerous scene prediction device in Exemplary Embodiment 4.

The operation of the dangerous scene prediction device 400 in this exemplary embodiment will be described below. FIG. 17 is a flowchart depicting an example of the operation of the dangerous scene prediction device 400 in this exemplary embodiment. The flowchart in FIG. 17 depicts a process in the case where a learning model for performing dangerous scene prediction is prioritized. The process by which the scene determination unit 10 determines the scene of the vehicle is the same as the process in step S11 in FIG. 12.

The allowable computation amount decision unit 52 decides an allowable computation amount depending on a determined scene (step S41). The model adjustment unit 51 then decides a learning model for performing dangerous scene prediction (step S31), and decides an object recognition neural NW based on the computation amount (computation amount level) required for the dangerous scene prediction process using the decided learning model and the decided allowable computation amount (step S32). The subsequent process until a dangerous scene is predicted is the same as the process in steps S33 to S35 in FIG. 12.

Figure 18:
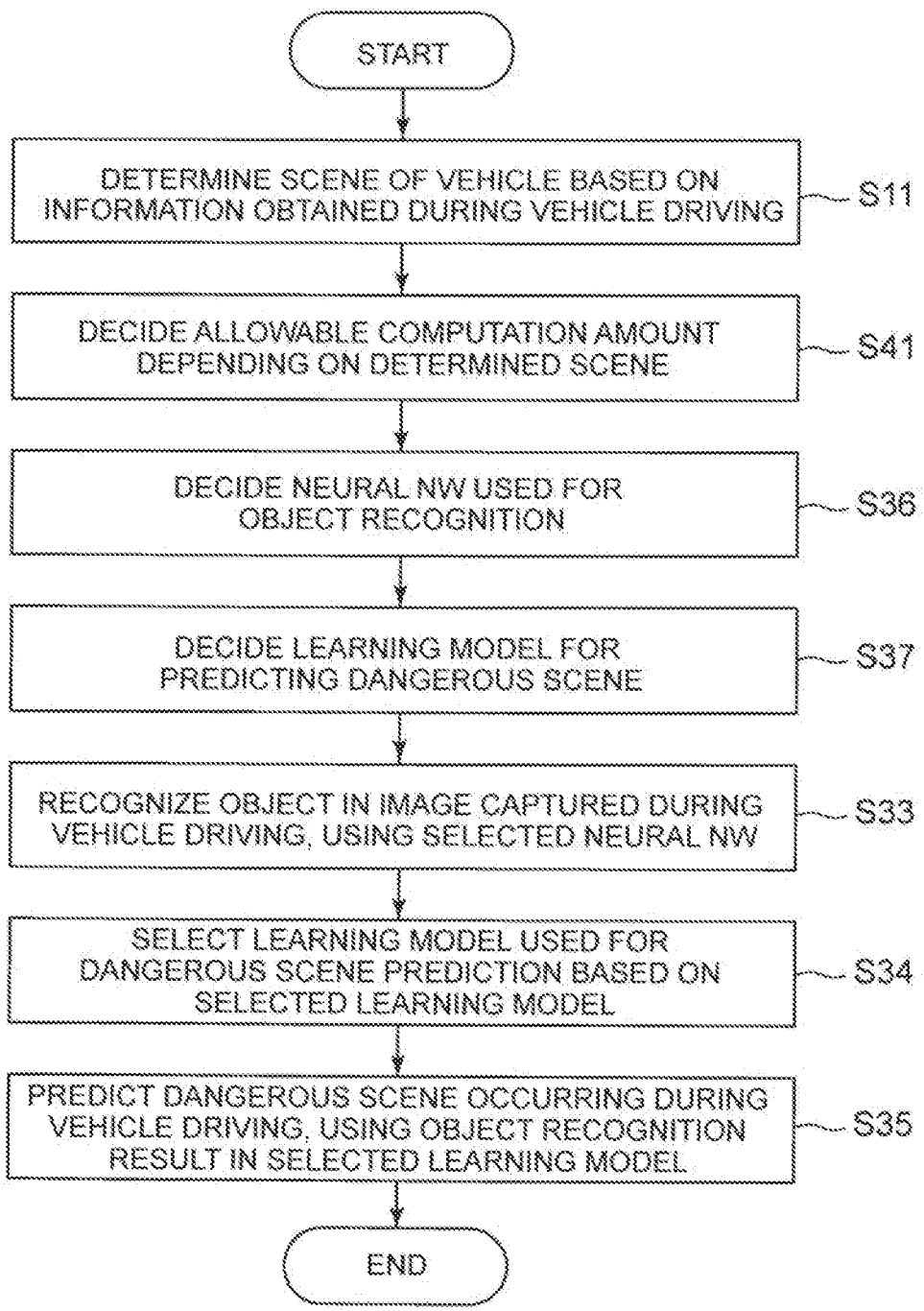
FIG. 18 It is a flowchart depicting another example of the operation of the dangerous scene prediction device in Exemplary Embodiment 4.

FIG. 18 is a flowchart depicting another example of the operation of the dangerous scene prediction device 400 in this exemplary embodiment. The flowchart in FIG. 18 depicts a process in the case where a neural NW used for object recognition is prioritized. The process by which the scene determination unit 10 determines the scene of the vehicle is the same as the process in step S11 in FIG. 17.

The allowable computation amount decision unit 52 decides an allowable computation amount depending on a determined scene (step S41). The model adjustment unit 51 then decides a neural NW used for object recognition (step S36), and decides a learning model for performing dangerous scene prediction based on the computation amount (computation amount level) required for the object recognition process using the decided neural NW and the decided allowable computation amount (step S37). The subsequent process until a dangerous scene is predicted is the same as the process in steps S33 to S35 in FIG. 17.

As described above, in this exemplary embodiment, the allowable computation amount decision unit 52 decides an allowable computation amount depending on the allowable time of dangerous scene prediction for the determined scene. The model adjustment unit 51 decides a neural NW and a learning model so that the computation amount required for the process in object recognition and the process of dangerous scene prediction will be less than or equal to the decided allowable computation amount. Thus, in addition to the effects in Exemplary Embodiment 3, the processing speed and the recognition and prediction accuracy in object recognition and dangerous scene prediction can be optimized depending on the scene determination result.

Figure 19:
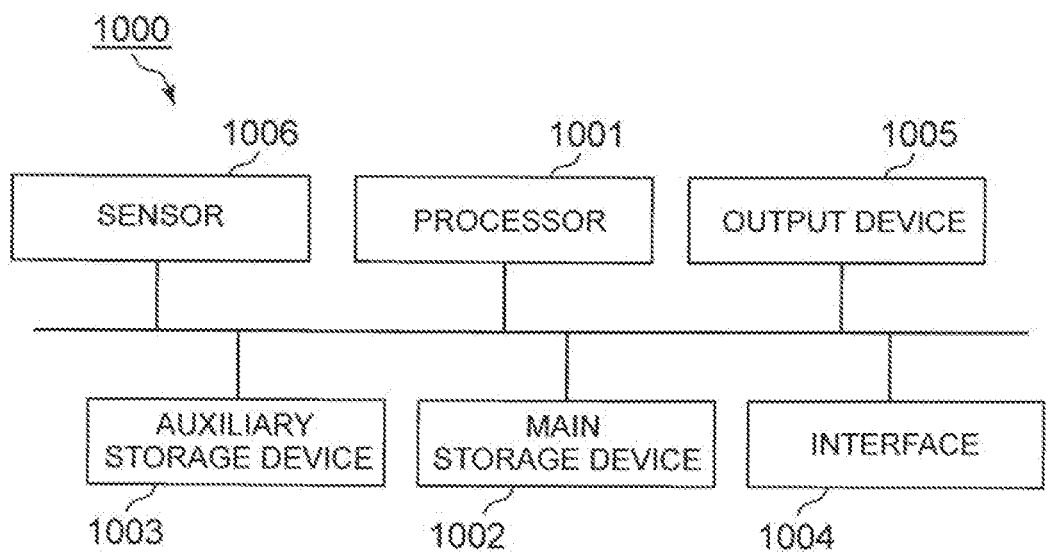
FIG. 19 It is a schematic block diagram depicting the structure of a computer according to at least one of the foregoing exemplary embodiments.

A specific example according to the present invention will be described below. FIG. 19 is a schematic block diagram depicting the structure of a computer according to at least one of the foregoing exemplary embodiments. A computer 1000 includes a processor 1001, a main storage device 1002, an auxiliary storage device 1003, an interface 1004, an output device 1005, and a sensor 1006. The computer 1000 is, for example, a vehicle-mounted computer mounted in a vehicle, and controls the vehicle according to the dangerous scene prediction result. The computer 1000 can therefore be regarded as a vehicle control device. In this case, the processor 1001 operates as a vehicle control unit.

The foregoing dangerous scene prediction device is implemented in the computer 1000, and receives input of various information detected by the sensor 1006 (e.g. GPS receiver, millimeter wave radar, LiDAR, camera, etc.). The operation of each processing unit described above is stored in the auxiliary storage device 1003 in the form of a program (dangerous scene prediction program). The processor 1001 reads the program from the auxiliary storage device 1003, expands the program in the main storage device 1002, and executes the above-described process according to the program.

In at least one exemplary embodiment, the auxiliary storage device 1003 is an example of a non-transitory tangible medium. Examples of the non-transitory tangible medium include a magnetic disk, magneto-optical disk, CD-ROM (compact disc read-only memory), DVD-ROM (read-only memory), and semiconductor memory connected via the interface 1004. In the case where the program is distributed to the computer 1000 through a communication line, the computer 1000 to which the program has been distributed may expand the program in the main storage device 1002 and execute the above-described process.

The program may realize part of the above-described functions. The program may be a differential file (differential program) that realizes the above-described functions in combination with another program already stored in the auxiliary storage device 1003.

The output device 1005 notifies the driver whether there is a danger, based on the processing result by the computer, i.e. the dangerous scene prediction result by the dangerous scene prediction device. For example, the output device 1005 notifies the driver of the occurrence of a danger, by sound or by display on a display device (not depicted). As a result of providing such information, the driver can be notified of the danger.

The output device 1005 may control the vehicle by notifying a control device (not depicted) of the vehicle of a predicted dangerous scene. By outputting such information, it is possible to automatically control the vehicle depending on the dangerous scene.

Figure 20:
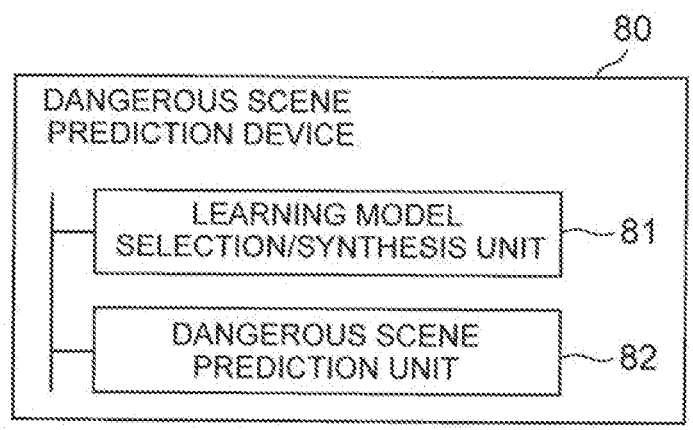
FIG. 20 It is a block diagram depicting an overview of a dangerous scene prediction device according to the present invention.

An overview of the present invention will be described below. FIG. 20 is a block diagram depicting an overview of a dangerous scene prediction device according to the present invention. The dangerous scene prediction device according to the present invention is a dangerous scene prediction device 80 (e.g. dangerous scene prediction device 100 to 400) for predicting a dangerous scene occurring during driving of a vehicle, the dangerous scene prediction device including: a learning model selection/synthesis unit 81 (e.g. learning model selection/synthesis unit 20) for selecting, from two or more learning models, a learning model used for predicting the dangerous scene, depending on a scene determined based on information (e.g. position information, millimeter wave information, LiDAR information, camera information) obtained during the driving of the vehicle; and a dangerous scene prediction unit 82 (e.g. dangerous scene prediction unit 30) for predicting the dangerous scene occurring during the driving of the vehicle, using the selected learning model.

With such a structure, the prediction accuracy for dangerous scenes expected during driving can be improved while reducing the computation load.

The dangerous scene prediction device 80 (e.g. dangerous scene prediction device 200) may include: a recognition object information decision unit (e.g. recognition object/posture decision unit 40) for deciding recognition object information that is information about an object subjected to recognition, based on information of the learning model selected by the learning model selection/synthesis unit 81; a learning model selection unit (e.g. learning model selection unit 50) for selecting, from two or more learning models, an object recognition model that is a learning model used for object recognition, depending on the scene determined based on the information obtained during the driving of the vehicle and the recognition object information; and an object recognition unit (e.g. object recognition unit 60) for recognizing an object in an image captured during the driving of the vehicle, using the selected object recognition model. The dangerous scene prediction unit 82 may predict the dangerous scene occurring during the driving of the vehicle, using an object recognition result by the object recognition unit in the selected learning model. With such a structure, the object recognition model can be selected based on the recognition object and posture necessary for the dangerous scene prediction model, so that the dangerous scene prediction accuracy can be improved.

The dangerous scene prediction device 80 (e.g. dangerous scene prediction device 300) may include: a model adjustment unit (e.g. model adjustment unit 51) for deciding a neural network used for object recognition and a learning model used for prediction of the dangerous scene, depending on the determined scene; and an object recognition unit (e.g. object recognition unit 61) for recognizing an object in an image captured during the driving of the vehicle, using the selected neural network. The model adjustment unit may decide the neural network and the learning model so that a computation amount required for a process in the object recognition and a process of the prediction of the dangerous scene will be less than or equal to an allowable computation amount that is a computation amount allowed. The learning model selection/synthesis unit 81 may select the learning model used for predicting the dangerous scene, based on the selected learning model, and the dangerous scene prediction unit 82 may predict the dangerous scene occurring during the driving of the vehicle, using an object recognition result by the object recognition unit in the selected learning model. By taking into account the computation amount of the neural NW for performing object recognition and the learning model for performing dangerous scene prediction in this way, dangerous scene prediction can be performed with high accuracy within limited resources.

Specifically, the model adjustment unit may decide, depending on the determined scene, a relative priority of the process in the object recognition and the process of the prediction of the dangerous scene, and decides, based on the decided priority, the neural network and the learning model so that the computation amount required for the process in the object recognition and the process of the prediction of the dangerous scene will be less than or equal to the allowable computation amount.

The dangerous scene prediction device 80 (e.g. dangerous scene prediction device 400) may include an allowable computation amount decision unit (e.g. allowable computation amount decision unit 52) for deciding the allowable computation amount, depending on an allowable time of the prediction of the dangerous scene for the determined scene. The model adjustment unit may decide the neural network and the learning model so that the computation amount required for the process in the object recognition and the process of the prediction of the dangerous scene will be less than or equal to the allowable computation amount. With such a structure, the processing speed and the recognition and prediction accuracy in object recognition and dangerous scene prediction can be optimized depending on the scene determination result.

The dangerous scene prediction device 80 may include a scene determination unit for determining the scene of the vehicle, based on the information obtained during the driving of the vehicle.

Although the present invention has been described with reference to the exemplary embodiments and examples, the present invention is not limited to the foregoing exemplary embodiments and examples. Various changes understandable by those skilled in the art can be made to the structures and details of the present invention within the scope of the present invention.

This application claims priority based on Japanese Patent Application No. 2018-212890 filed on Nov. 13, 2018, the disclosure of which is incorporated herein in its entirety.

REFERENCE SIGNS LIST

10 scene determination unit
20, 21 learning model selection/synthesis unit
30, 31 dangerous scene prediction unit
40 recognition object/posture decision unit
50 learning model selection unit
51 model adjustment unit
52 allowable computation amount decision unit
60, 61 object recognition unit
70 imaging device
90, 91, 92 storage unit
100, 200, 300, 400 dangerous scene prediction device

What is claimed is:

1. A dangerous scene prediction device for predicting whether a dangerous situation has occurred during driving of a vehicle, the dangerous scene prediction device comprising a storage and a hardware processor, the hardware processor configured to execute software code to:
   obtain information during the driving of the vehicle, from sensors of the vehicle;
   determine a scene denoting an external environment surrounding the vehicle, based on the obtained information;
   determine an allowable computation amount for the predicting whether the dangerous situation has occurred during the driving of the vehicle;
   select, from a plurality of machine learning models in the storage corresponding to different scenes and having different required computation amounts, a machine learning model to predict whether the dangerous situation has occurred, depending on the determined scene and the allowable computation amount, the selected machine learning model corresponding to the different scene that best matches the determined scene and for which the different required computation amount is less than the allowable computation amount;
   decide recognition object information about an object subject to recognize the recognition object associated with the selected machine learning model according to a predefined relationship between machine learning models and the recognition object information;
   select an object recognition model used for object recognition from two or more object recognition models stored in the storage, the object recognition model associated with the determined scene and the decided recognition object information according to a predefined relationship between scenes, the recognition object information and the two or more object recognition models;
   recognize an object in an image captured during the driving of the vehicle, using the selected object recognition model;
   predict whether the dangerous situation has occurred during the driving of the vehicle from a recognition result of the object in the image, using the selected machine learning model, such that a time to perform prediction occurs is less than the allowable computation amount due to the different required computation amount of the selected learning model being less than the allowable computation amount; and
   in response to predicting that the dangerous situation has occurred, transmit notification of the dangerous situation to a control device of the vehicle to cause the control device to control the vehicle based on the dangerous situation.

2. The dangerous scene prediction device according to claim 1, wherein the hardware processor is configured to execute the software code to:
   decide a neural network used for the object recognition and the machine learning model used for prediction of the dangerous situation, depending on the determined scene;
   recognize the object in the image captured during the driving of the vehicle, using the neural network;
   decide the neural network and the machine learning model so that a computation amount required for a process in the object recognition and a process of the prediction of the dangerous situation are less than or equal to the allowable computation amount;
   select the machine learning model used for predicting the dangerous situation, based on the decided machine learning model; and
   predict the dangerous situation occurring during the driving of the vehicle, using an object recognition result in the selected machine learning model.

3. The dangerous scene prediction device according to claim 2, wherein the hardware processor is configured to execute the software code to decide, depending on the determined scene, a relative priority of the process in the object recognition and a relative priority of the process of the prediction of the dangerous situation, and decide, based on the decided relative priority, the neural network and the learning model so that the computation amount required for the process in the object recognition and the process of the prediction of the dangerous situation are less than or equal to the allowable computation amount.

4. The dangerous scene prediction device according to claim 2, wherein the hardware processor is configured to execute the software code to;
   decide the allowable computation amount, depending on an allowable time of the prediction of the dangerous situation for the determined scene; and
   decide the neural network and the machine learning model so that the computation amount required for the process in the object recognition and the process of the prediction of the dangerous situation are less than or equal to the allowable computation amount.

5. A dangerous scene prediction method for predicting whether a dangerous situation has occurred occurring during driving of a vehicle, the dangerous scene prediction method performed by a hardware processor and comprising:

obtaining information during the driving of the vehicle, from sensors of the vehicle;

determining a scene denoting an external environment surrounding the vehicle, based on the obtained information;

determining an allowable computation amount for the predicting whether the dangerous situation has occurred during the driving of the vehicle;

selecting, from a plurality of machine learning models in the storage corresponding to different scenes and having different required computation amounts, a machine learning model to predict whether the dangerous situation has occurred, depending on the determined scene and the allowable computation amount, the selected machine learning model corresponding to the different scene that best matches the determined scene and for which the different required computation amount is less than the allowable computation amount;

deciding recognition object information about an object subject to recognize the recognition object associated with the selected machine learning model according to a predefined relationship between machine learning models and the recognition object information;

selecting an object recognition model used for object recognition from two or more object recognition models stored in the storage, the object recognition model associated with the determined scene and the decided recognition object information according to a predefined relationship between scenes, the recognition object information and the two or more object recognition models;

recognizing an object in an image captured during the driving of the vehicle, using the selected object recognition model;

predicting whether the dangerous situation has occurred during the driving of the vehicle from a recognition result of the object in the image, using the selected machine learning model, such that a time to perform prediction occurs is less than the allowable computation amount due to the different required computation amount of the selected learning model being less than the allowable computation amount; and in response to predicting that the dangerous situation has occurred, transmitting notification of the dangerous situation to a control device of the vehicle to cause the control device to control the vehicle based on the dangerous situation.

6. A non-transitory computer readable information recording medium storing a dangerous scene prediction program for use in a computer to perform a method for predicting a dangerous situation has occurred during driving of a vehicle, the method comprising:

obtaining information during the driving of the vehicle, from sensors of the vehicle;

determining a scene denoting an external environment surrounding the vehicle, based on the obtained information;

determining an allowable computation amount for the predicting whether the dangerous situation has occurred during the driving of the vehicle;

selecting, from a plurality of machine learning models in the storage corresponding to different scenes and having different required computation amounts, a machine learning model to predict whether the dangerous situation has occurred, depending on the determined scene and the allowable computation amount, the selected machine learning model corresponding to the different scene that best matches the determined scene and for which the different required computation amount is less than the allowable computation amount;

deciding recognition object information about an object subject to recognize the recognition object associated with the selected machine learning model according to a predefined relationship between machine learning models and the recognition object information;

selecting an object recognition model used for object recognition from two or more object recognition models stored in the storage, the object recognition model associated with the determined scene and the decided recognition object information according to a predefined relationship between scenes, the recognition object information and the two or more object recognition models;

recognizing an object in an image captured during the driving of the vehicle, using the selected object recognition model;

predicting whether the dangerous situation has occurred during the driving of the vehicle from a recognition result of the object in the image, using the selected machine learning model, such that a time to perform prediction occurs is less than the allowable computation amount due to the different required computation amount of the selected learning model being less than the allowable computation amount; and in response to predicting that the dangerous situation has occurred, transmitting notification of the dangerous situation to a control device of the vehicle to cause the control device to control the vehicle based on the dangerous situation.

* * * * *